US012522239B2

(12) United States Patent
Terazawa et al.

(10) Patent No.: US 12,522,239 B2
(45) Date of Patent: Jan. 13, 2026

(54) VEHICLE CONTROL METHOD AND VEHICULAR DEVICE

(71) Applicant: DENSO CORPORATION, Kariya (JP)

(72) Inventors: Tomohito Terazawa, Kariya (JP); Genki Kitahara, Kariya (JP); Ryota Terada, Kariya (JP); Yasuhiko Mukai, Kariya (JP); Yuuta Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 18/297,938

(22) Filed: Apr. 10, 2023

(65) Prior Publication Data

US 2023/0256992 A1 Aug. 17, 2023

Related U.S. Application Data

(63) Continuation of application No. PCT/JP2021/037021, filed on Oct. 6, 2021.

(30) Foreign Application Priority Data

Oct. 13, 2020 (JP) .............................. JP2020-172813

(51) Int. Cl.
*B60W 60/00* (2020.01)
*G01C 21/00* (2006.01)

(52) U.S. Cl.
CPC ....... *B60W 60/001* (2020.02); *G01C 21/3811* (2020.08); *G01C 21/3889* (2020.08); *B60W 2556/40* (2020.02); *B60W 2556/50* (2020.02)

(58) Field of Classification Search
CPC ........... B60W 60/001; B60W 2556/50; B60W 2556/40; G01C 21/3889; G01C 21/3811

(Continued)

(56) References Cited

U.S. PATENT DOCUMENTS

2006/0025923 A1*  2/2006  Dotan .............. G08G 1/096861
                                                       340/995.12
2006/0101005 A1*  5/2006  Yang ................... G06F 16/9537
(Continued)

FOREIGN PATENT DOCUMENTS

CN      110087964 A  *  8/2019  ............. B60K 28/06
DE  112016004751 T5  *  7/2018  ............ B60W 30/12
(Continued)

OTHER PUBLICATIONS

Arfaoui, Nouha, and Jalel Akaichi. "Vehicle Trajectory Data Warehouse: Point of Interest and Time Interval of Interest." Proceedings of the Second International Conference on Internet of Things, Data and Cloud Computing. New York, NY, USA: ACM, 2017. 1-6. Web. (Year: 2017).*

*Primary Examiner* — Ramya P Burgess
*Assistant Examiner* — Keith A von Volkenburg
(74) *Attorney, Agent, or Firm* — Maschoff Brennan

(57) ABSTRACT

A map server acquires a position coordinate and a category of a POI. The map server sets a notice area at a predetermined distance backward from the POI in a traveling direction along a road. The map server distributes map data to a vehicle. The map data is a data set including a position of the notice area, a condition of a vehicle affected by the POI, and a category of the POI. The vehicle recognizes presence of the POI based on a fact that the vehicle has passed through the notice area indicated in the map data, and creates a control plan according to the category of the POI.

16 Claims, 12 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2006/0122772 | A1* | 6/2006 | Lee | G01C 21/3691 |
| | | | | 701/439 |
| 2010/0317368 | A1* | 12/2010 | Augst | H04W 4/02 |
| | | | | 455/456.1 |
| 2010/0332121 | A1* | 12/2010 | Okude | G01C 21/3415 |
| | | | | 701/533 |
| 2013/0151645 | A1* | 6/2013 | Siliski | H04L 67/52 |
| | | | | 709/213 |
| 2018/0345963 | A1 | 12/2018 | Maura | |
| 2019/0311207 | A1* | 10/2019 | Oniwa | B60W 50/12 |
| 2019/0362633 | A1* | 11/2019 | Kiryu | B60W 30/18163 |
| 2020/0073404 | A1 | 3/2020 | Shi et al. | |
| 2020/0156645 | A1* | 5/2020 | Niioka | B60W 10/04 |
| 2020/0158519 | A1* | 5/2020 | McGavran | G06F 8/65 |
| 2020/0209002 | A1* | 7/2020 | Hou | G06N 20/00 |
| 2020/0223452 | A1* | 7/2020 | Toda | G08G 1/09 |
| 2020/0282978 | A1* | 9/2020 | Shoda | B60W 10/04 |
| 2020/0296558 | A1* | 9/2020 | Adare | H04W 68/005 |
| 2020/0298842 | A1* | 9/2020 | Takamatsu | B60W 30/09 |
| 2020/0318986 | A1* | 10/2020 | Nara | G01C 21/3484 |

FOREIGN PATENT DOCUMENTS

| | | | | |
|---|---|---|---|---|
| IN | 201614037162 A | * | 6/2017 | ............ B60W 30/10 |
| JP | 2003-042792 A | | 2/2003 | |
| JP | 2009-252062 A | | 10/2009 | |
| JP | 2020091612 A | * | 6/2020 | |
| JP | 2020-135635 A | | 8/2020 | |
| WO | WO-2015005098 A1 | * | 1/2015 | ............ H04W 4/046 |

* cited by examiner

FIG. 5

| | | | | |
|---|---|---|---|---|
| D1 | NOTICE AREA POSITION DATA | CENTER POSITION | (Xj, Yj) | ~ Fd0 |
| | | RADIUS | (15m) | |
| D2 | POI RELATED DATA | INITIAL REMAINING DISTANCE | (1500m) | ~ Fd1 |
| | | POI CATEGORY | (OBSTACLE) | ~ Fd2 |
| | | VALIDITY CONDITION — LANE ID | (2) | |
| | | VALIDITY CONDITION — SPEED | (—) | ~ Fd3 |
| | | VALIDITY CONDITION — TRAVELING DIRECTION | (30°) | |
| | | ACTION TIMING | (500m) | ~ Fd4 |
| | | RECOMMENDED ACTION | (LC) | ~ Fd5 |
| | | SUPPLEMENTARY INFO | (LANE ID: 1) | ~ Fd6 |

VEHICLE CONTROL METHOD AND VEHICULAR DEVICE

CROSS REFERENCE TO RELATED APPLICATIONS

The present application is a continuation application of International Patent Application No. PCT/JP2021/037021 filed on Oct. 6, 2021, which designated the U.S. and claims the benefit of priority from Japanese Patent Application No. 2020-172813 filed on Oct. 13, 2020. The entire disclosures of all of the above applications are incorporated herein by reference.

TECHNICAL FIELD

The present disclosure relates to a technique of using map data including information regarding a point of interest.

BACKGROUND

There is a technology using map data in which a point of interest is associated with network data indicating a connection relationship between roads.

SUMMARY

According to at least one embodiment of the present disclosure, a vehicle control method is executed by cooperation of a map server and a vehicular device. The vehicle control method includes acquiring, by the map server, a position coordinate and a category of a real point that is an actually existing point at which a point of interest used in travel control is located. The vehicle control method includes setting, by the map server, a notice area having a predetermined size and located at a predetermined distance backward from the real point along a road. The vehicle control method includes generating, by the map server, target vehicle information indicating a condition of a target vehicle to be affected by the point of interest. The vehicle control method includes distributing, by the map server, map data as a data set regarding the information of the notice area, and category information of the point of interest. The vehicle control method includes acquiring, by the vehicular device, vehicle position information indicating a current position of a host vehicle in which the vehicular device is provided. The vehicle control method includes acquiring, by the vehicular device, the map data distributed from the map server. The vehicle control method includes determining, by the vehicular device, whether the host vehicle has passed through the notice area indicated in the map data based on the vehicle position information. The vehicle control method includes determining, by the vehicular device, whether the point of interest corresponding to the notice area affects a traveling plan of the host vehicle based on the target vehicle information corresponding to the notice area and information obtained from an in-vehicle sensor when it is determined that the host vehicle has passed through the notice area. The vehicle control method includes creating, by the vehicular device, a control plan according to a category of the point of interest when it is determined that the point of interest affects the traveling plan of the host vehicle.

BRIEF DESCRIPTION OF THE DRAWINGS

The details of one or more embodiments are set forth in the accompanying drawings and the description below.

Other features and advantages will be apparent from the description and drawings, and from the claims.

FIG. 5 is a diagram showing an example of a configuration of a POI data set.

DETAILED DESCRIPTION

Figure 1:
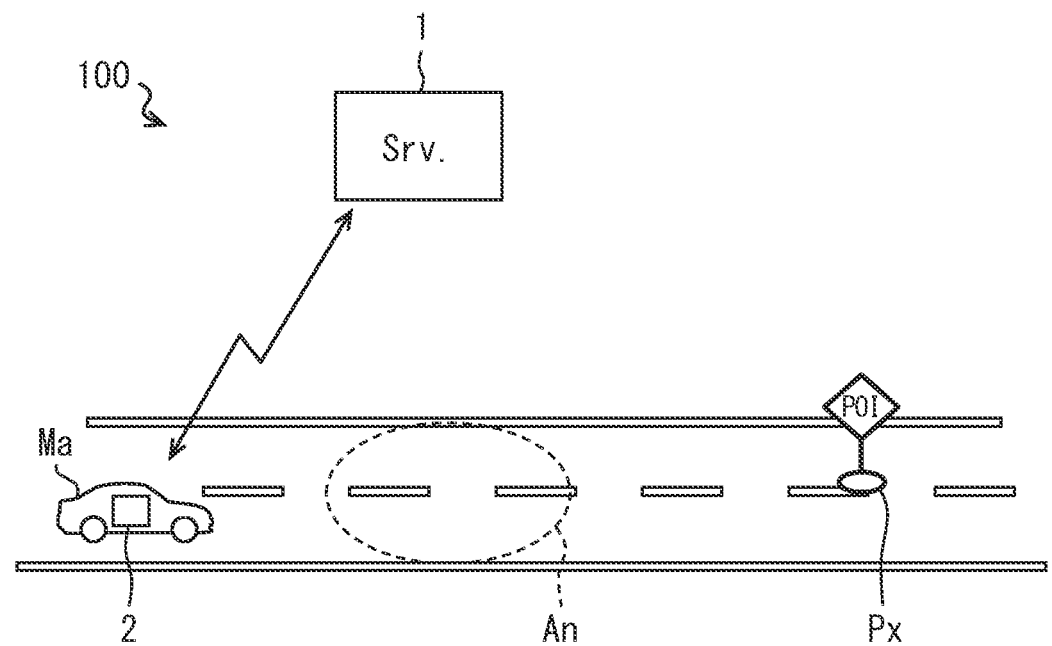
FIG. 1 is a diagram conceptually showing an overall image of a vehicle control system.

The present disclosure relates to a technique of distributing and using map data including information regarding a point of interest that can affect travel control, such as a temporary stop line and an obstacle.

According to a comparative example, a temporary stop line existing ahead of a vehicle is detected by using map data in which positions of temporary stop lines are associated with network data indicating a connection relationship of roads, and an occupant is notified of the presence of the temporary stop line, for example, 50 m ahead. The network data includes, for example, data regarding a node which is a point set on a road to represent a connection relationship of the road, such as a point where the road branches and merges or a terminal portion, and data regarding a link which is a road section connecting the nodes.

A map (hereinafter, partial map) for a local range according to a current position of a vehicle or the like may be downloaded from a map server each time and using the map for vehicle control such as automated driving.

A navigation device may determine that a vehicle has reached an advance notice point on the basis of entry of the vehicle within a predetermined distance from a preset announcement point, and notifies an occupant of information on the announcement point.

In a case where a point of interest (POI) such as a temporary stop line is associated with the network data, a POI through which the vehicle is scheduled to pass can be detected in advance by going through the network data. The POI here means a point that affects the vehicle control, such as a temporary stop line, a sharp curve, a falling object, or a tail end of a traffic jam. That is, the POI in the present disclosure means a point of interest in the traveling control rather than a place that can be a destination such as a sightseeing spot or facility.

Meanwhile, map data of an area corresponding to the current position of the vehicle may be downloaded from the map server and used. However, in general, network data has a large capacity. Therefore, when a data set including the network data is downloaded from the map server each time as the map data of the area corresponding to the current position of the vehicle, a burden related to communication increases.

If the map data for distribution is a data set that includes data related to POIs but does not include the network data, the amount of communication of the map data can be reduced. However, when the network data and POI information are separated from each other, there arises a new problem that the POI existing ahead of the vehicle cannot be detected by going through the network data.

For example, if the server distributes a data set including position coordinates of the POI as the POI information, the vehicle can detect the POI existing within a predetermined distance from the current position. However, in this assumed configuration, the vehicle cannot determine whether the POI information distributed from the map server is a POI truly related to a traveling plan of the vehicle. For example, the vehicle cannot distinguish the POI for the vehicle from a POI for another vehicle traveling in the opposite lane. As a result, there is a possibility that the system inappropriately acts against the POI for the other vehicle traveling in the opposite lane.

In contrast to the comparative example and the assumed configuration, according to the present disclosure, an inappropriate action of a vehicle against point-of-interest information can be reduced while an amount of communication of map data is reduced.

According to an aspect of the present disclosure, a vehicle control method is executed by cooperation of a map server and a vehicular device. The vehicle control method includes acquiring, by the map server, a position coordinate and a category of a real point that is an actually existing point at which a point of interest used in travel control is located. The vehicle control method includes setting, by the map server, a notice area having a predetermined size and located at a predetermined distance backward from the real point in a traveling direction along a road. The vehicle control method includes generating, by the map server, target vehicle information indicating a condition of a target vehicle to be affected by the point of interest. The vehicle control method includes distributing, by the map server, map data as a data set regarding the point of interest, the map data including the target vehicle information, position information of the notice area, and category information of the point of interest. The vehicle control method includes acquiring, by the vehicular device, vehicle position information indicating a current position of a host vehicle in which the vehicular device is provided. The vehicle control method includes acquiring, by the vehicular device, the map data distributed from the map server. The vehicle control method includes determining, by the vehicular device, whether the host vehicle has passed through the notice area indicated in the map data based on the vehicle position information. The vehicle control method includes determining, by the vehicular device, whether the point of interest corresponding to the notice area affects a traveling plan of the host vehicle based on the target vehicle information corresponding to the notice area and information obtained from an in-vehicle sensor when it is determined that the host vehicle has passed through the notice area. The vehicle control method includes creating, by the vehicular device, a control plan according to a category of the point of interest when it is determined that the point of interest affects the traveling plan of the host vehicle.

In the above method, the map server distributes, to the vehicular device, the position information of the notice area disposed a predetermined distance backward from the point of interest and the target vehicle information indicating the condition of the target vehicle to be affected by the point of interest. The position information and the target vehicle information are associated with each other. The vehicular device recognizes presence of the point of interest existing ahead based on a fact that the host vehicle has passed through the notice area, and determines whether the point of interest affects the traveling plan of the host vehicle based on the target vehicle information. Then, the vehicular device determines whether to create the control plan according to the category of the point of interest based on a result of the above determination.

This method allows the vehicular device to recognize the presence of the point of interest existing ahead of the host vehicle even if point-of-interest information is not associated with a network data indicating a connection relationship of roads. Since the map data does not need to include a network data, an amount of communication of the map data can be reduced. Moreover, since the target vehicle information is additionally used in the determination, when the point of interest corresponding to the notice area through which the host vehicle has passed does not affect the traveling plan of the host vehicle, the control plan corresponding to the point of interest is not created. That is, it is possible to reduce a risk of an inappropriate action against the point of interest unrelated to the host vehicle. That is, it is possible to reduce the inappropriate action of the vehicle against the point-of-interest information while the amount of communication of the map data is reduced.

According to another aspect of the present disclosure, a map server is used for distribution of map data to a vehicle. The map data includes information regarding a point of interest used in travel control of the vehicle. The map server includes a point-of-interest acquirer, a notice area setting unit, a target vehicle setting unit and a distribution processing unit. The point-of-interest acquirer acquires a position coordinate and a category of a real point that is an actually existing point at which the point of interest is located. The notice area setting unit sets a notice area having a predetermined size and located at a predetermined distance backward from the real point in a traveling direction along a road. The target vehicle setting unit generates target vehicle information indicating a condition of a target vehicle to be affected by the point of interest. The distribution processing unit distributes map data as a data set regarding the point of interest, the map data including the target vehicle information, position information of the notice area, and category information of the point of interest.

The map server has a configuration corresponding to steps of the above-described vehicle control method performed by the map server. Therefore, the map server makes it possible to obtain similar operations and effects to those of the vehicle control method by cooperation with the vehicular device.

According to another aspect of the present aspect, a vehicular device is used for vehicle control using map data including information regarding a point of interest used in travel control. The vehicular device includes a map acquirer, a vehicle position acquirer, a passed-through determiner, a validity determiner and a control planner. The map acquirer acquires a map data distributed from a map server, the map data being a data set including target vehicle information indicating a condition of a target vehicle to be affected by the point of interest, position information of a notice area corresponding to the point of interest, and category information of the point of interest. The vehicle position acquirer acquires vehicle position information indicating a current position of a host vehicle. The passed-through determiner determines whether the host vehicle has passed through the notice area indicated in the map data based on the vehicle position information acquired by the vehicle position acquirer. The validity determiner determines whether the point of interest corresponding to the notice area affects a traveling plan of the host vehicle based on the target vehicle information corresponding to the notice area and information obtained from an in-vehicle sensor when the passed-through determiner determines that the host vehicle has passed through the notice area. The control planner creates a control plan according to a category of the point of interest when the validity determiner determines that the point of interest affects the traveling plan of the host vehicle.

The vehicular device is a device used in the vehicle control method described above, and includes a configuration corresponding to steps of the vehicle control method performed by the vehicular device. Therefore, the vehicular device makes it possible to obtain similar operations and effects to those of the vehicle control method by cooperation with the map server.

According to another aspect of the present disclosure, a map data structure is a data structure of map data including information regarding a point of interest in travel control. The map data structure includes an area position field configured to store information indicating a position of a notice area for causing a vehicle to recognize presence of the point of interest. The notice area is set at a position along a road a predetermined distance backward in a traveling direction from a real point that is an actually existing point at which the point of interest is located. The map data structure includes a remaining distance field configured to store information regarding a distance from the notice area to the real point. The map data structure includes a category field configured to store information indicating a category of the point of interest. The map data structure includes a target vehicle field configured to store target vehicle information indicating a condition of a target vehicle to be affected by the point of interest. The map data structure includes a control target field configured to store at least one of a target speed of the target vehicle at the point of interest, information about a position of the target vehicle at which arithmetic processing is started for determining a position of the target vehicle at which adjustment of a traveling speed of the target vehicle toward the target speed is started, trajectory determination data for determining a traveling trajectory of the target vehicle near the point of interest, or information of recommended lane for the target vehicle. The control target field is information for causing a processor included in a vehicular device to execute control according to a category of the point of interest.

In the map data structure, since the map data includes the control target field, it is possible to cause the vehicular device that satisfies the condition indicated by the target vehicle information to execute control according to the category of the point of interest. A vehicular device that does not satisfy the condition indicated by the target vehicle information does not execute control according to the category of the point of interest. That is, it is possible to reduce an inappropriate action of the vehicle against the point-of-interest information. Furthermore, in the map data, a region for storing the network data is not essential. Therefore, the network data can be omitted from the map data. That is, the map data structure can reduce the inappropriate action of the vehicle against the point-of-interest information while the amount of communication of the map data is reduced.

An embodiment of a vehicle control system 100 according to the present disclosure will be described with reference to the drawings. In the following description, a region where left-hand driving is legalized will be described as an example. In an area where right-hand driving is legalized, the present disclosure can be implemented with the right and left reversed. The present disclosure can be appropriately modified and implemented so as to conform to the laws, regulations, and conventions of a region where an in-vehicle system 2 is used. Note that parallel in describing a road structure, a traveling direction of a vehicle, and the like in the present disclosure is not limited to completely parallel in which an angle formed with each other is 0°. It is also possible to include a state in which the angle formed with each other are inclined by about 20°, for example, 5° or 10°. Expressions such as vertical and an identical direction can also include the state of being inclined by about 20°.

<Overview of Overall Configuration>

FIG. 1 is a diagram showing an example of a schematic configuration of the vehicle control system 100 according to the present disclosure. As shown in FIG. 1, the vehicle control system 100 includes a map server 1 existing outside a vehicle and the in-vehicle system 2 constructed in a vehicle Ma. Although FIG. 1 illustrates only one vehicle Ma equipped with the in-vehicle system 2, a plurality of vehicles Ma equipped with the in-vehicle system 2 can exist. That is, a plurality of vehicles constituting the vehicle control system 100 can exist.

The in-vehicle system 2 can be mounted on various vehicles Ma that can travel on roads. The vehicle Ma may be a two-wheeled vehicle, a three-wheeled vehicle, or the like in addition to a four-wheeled vehicle. A motorized bicycle can also be included in a two-wheeled vehicle. The vehicle Ma may be an owner car owned by an individual, or may be a vehicle provided for a car sharing service or a vehicle rental service (so-called car rental). Alternatively, the vehicle Ma may be a service car. The service car includes a taxi, a route bus, a sharing bus, and the like. The service car may be a robot taxi, an unmanned operation bus, or the like on which a driver is not on board. The service car can include a vehicle as an automatic delivery robot that automatically carries luggage to a predetermined destination. Furthermore, the equipped vehicle may be a remotely operated vehicle that is remotely operated by an operator present outside the vehicle. Here, the operator refers to a person who has authority to control the vehicle by remote control from outside of the vehicle.

Hereinafter, a host vehicle refers to one vehicle Ma equipped with the in-vehicle system 2. An occupant seated in a driver's seat (that is, an occupant in the driver's seat) of the host vehicle is also referred to as a user. The concept of the occupant in the driver's seat includes an operator. Note that front-rear, left-right, and up-down directions in the following description are defined with the host vehicle as a reference. Specifically, the front-rear direction is equivalent to a longitudinal direction of the host vehicle. The left-right direction is equivalent to a width direction of the host vehicle. The up-down direction is equivalent to a height direction of the vehicle. From a different perspective, the up-down direction is equivalent to a direction perpendicular to a plane parallel to the front-rear direction and the left-right direction.

By performing wireless communication with the map server 1, the in-vehicle system 2 downloads partial map data that is local high-precision map data from the map server 1, and uses the partial map data for driving assistance, automated driving, and navigation. The map server 1 updates map data as needed by integrating probe data uploaded from a plurality of vehicles. As separately described later, the probe data is equivalent to data including detection results of a division line, a landmark, an obstacle, and the like by a front camera 21 mounted on the vehicle.

<Configuration of Original Map Data>

First, original map data managed by the map server 1 will be described. The original map data is equivalent to, for example, map data indicating a road structure, position coordinates of features disposed along a road, a point of interest (POI), and the like with accuracy useful for automated driving. The original map data is equivalent to an origin (in other words, an original) of distribution map data described later.

The original map data handled by the map server 1 of the present embodiment is a probe data map (hereinafter, PD map) created and updated by integrating pieces of probe data observed by a plurality of vehicles, but is not limited thereto. The original map data may be a high-precision map (hereinafter, HD map) generated on the basis of data measured by a dedicated probe car equipped with a high-resolution LiDAR or the like, a result of a fixed-point surveying meter, a result of high-precision GPS surveying, or the like. LiDAR stands for light detection and ranging/laser imaging detection and ranging.

The POI in the present disclosure refers to a point where there is a factor that affects traveling control of the vehicle, such as a temporary stop line, a sharp curve, a falling object, or an end of a traffic jam. That is, the POI in the present disclosure refers to a point of interest in the traveling control rather than a point that can be a destination of movement such as a sightseeing spot or facility. In one aspect, the POI of the present disclosure is equivalent to a point where there is a factor for changing a traveling position, decelerating, accelerating, or the like. The change of the traveling position includes not only a lane change but also a movement of changing a lateral position in a lane, traveling across a lane, and the like. In addition, the POI of the present disclosure includes a POI existing on a road, a POI derived from a road structure, and the like. Specific examples of the POI will be separately described later.

The original map data includes, for example, network data, feature data, static POI data, and dynamic POI data. The network data is data indicating a connection relationship of a road network, and can be divided into road network data and lane network data. Each data is hierarchically configured. Here, as an example, in the original map data, feature data and various POI data are associated with the network data. In the original map data, various POIs and feature information are not necessarily associated with the network data. The configuration is sufficient as long as the road structure around the POI can be specified.

The road network data includes road link data for each road link and road node data for each road node. The road link data includes a link ID, a link length, the number of lanes, a road attribute, connection node information (for example, a node ID), and the like. The road node data includes a node ID, position coordinates, and connection link information (for example, a link ID). The road node is a point set on a road to represent a connection relationship of the road, such as a point where the road branches or merges or a terminal portion of the road. The road link refers to a road section connecting the road nodes. The road attribute includes, for example, a road name, a road category, a road width, lane number information indicating the number of lanes, a speed limit value, and the like. The road link data may also include data indicating a road category such as an exclusive road for automobiles or a general road. Here, the exclusive road for automobiles is a road where entry of pedestrians and bicycles is prohibited, and refers to, for example, a toll road such as a highway.

The lane network data is data indicating a connection relationship of lanes. The lane network data includes lane link data which is link data at a lane level and lane node data indicating a connection point of a lane. The lane link data for each lane includes, for example, a lane ID, a link ID at a lane level, a link length, and connection node information. The data for each lane node can include a node ID, position coordinates, and connection link information (for example, a link ID). The link data at the lane level is associated with a road link included in the road network data. Note that a lane link indicates a lane section connecting lane nodes.

The feature data includes, for example, road edge data, road marking data, and three-dimensional object data. The road edge data includes a coordinate point group indicating a position of a road edge. The position and shape information of the road edge may be expressed by a cubic spline curve. The road marking data is data indicating an installation position and a category of road marking. For example, a lane division line indicating a boundary of lanes, a crosswalk, a stop line, a channelizing zone, a safety zone, a regulation arrow, and the like are included in the road marking. Pavement paint indicating a road name can be also included in the road marking. A line, a symbol, and a character provided on a road surface are equivalent to the road marking. The road marking can include not only a paint but also a color difference of the road surface itself, a line, a symbol, and a character formed by a road rivet, a stone, or the like.

The road marking data includes division line data and scattered road marking data. The division line data is data on the lane division line. The lane division line includes a lane division line formed by a road rivet such as a chatter bar or Botts Dots. The division line data includes pattern information such as a broken line, a solid line, and a road rivet. The division line data includes a division line ID for each lane division line and a coordinate point group representing an installed portion. The position and shape information of the road edge and the division line may be expressed by a cubic spline curve. The lane division line is also referred to as a lane mark or a lane marker. The scattered road marking data is data on road marking other than a division line. The division line data is data on linear marking continuously extending along a road, whereas the scattered road marking data is equivalent to data on road marking scattered at necessary places such as temporary stop lines, crosswalks, and speed limit marking. The scattered road marking data indicates an installation position and a category of predetermined road marking other than division lines.

The three-dimensional object data represents a position and a category of a three-dimensional structure installed along a road. The three-dimensional structure installed along the road is, for example, a traffic sign, a commercial signboard, a pole, a guardrail, a curb, a tree, a utility pole, a traffic light, or the like. The traffic sign refers to, for example, a signboard provided with at least one of a symbol, a character string, or a pattern that functions as a regulation sign, a guide sign, a warning sign, an instruction sign, or the like. The guide sign includes an area signboard, a region name signboard indicating a region name, a road name signboard indicating a road name, an advance notice signboard notifying an entrance and exit of a highway, a service area, and the like. The shape and position of each three-dimensional structure are represented by, for example, a coordinate point group.

Some or all of the above-described structures installed along the road and predetermined road marking such as a division line and a temporary stop line are used as landmarks to be described later.

The static POI data is data indicating a position and a category of a static POI. The static POI refers to a POI that hardly changes over time among POIs and is required to be updated within, for example, a week. In other words, the static POI refers to a map element whose position and persistent state do not change in about several minutes to several hours. Examples of the category of the static POI include a tollgate, a tunnel entrance or exit, a branching and merging point of a highway, a lane change point, a speed limit change point, a sharp curve, a temporary stop position, a gradient change point, a depressed point, a specific sign installation location, and the like. Examples of the category of sign for which the static POI is to be set include a speed limit sign, a guide sign at a high-speed exit, a guide sign related to a branch to another highway, and a crosswalk. In addition, a lane disappearance point due to a decrease in the number of lanes, a point to be a right-turn lane or a left-turn lane, a railroad crossing, a traffic accident frequent point, and the like can also be included in the static POI. Each piece of static POI data includes a category and position information of the static POI.

The dynamic POI data is data indicating a position and a category of a dynamic POI. The dynamic POI refers to a POI whose position and persistent state change in several minutes to several hours or about one day among POIs. The dynamic POI includes, for example, the end of a traffic jam section, a construction section, a failed vehicle, a falling object, an accident point, a flooding point, a lane restriction, and the like. A heavy rain area in which a local heavy rain occurs, a road surface frozen section in which the road surface is frozen, a snowy spot, and the like can also be included in the dynamic POI.

The dynamic POI and the static POI are equivalent to map elements indicating positions and categories of features and events that affect a traveling plan of the vehicle. The dynamic POI and the static POI are registered and deleted by a POI manager G1 to be described later. The dynamic POI and the static POI, which are not distinguished from each other, are simply described as POIs. The position information of various POIs includes a lane ID of a POI existing lane which is a lane in which the POI exists, in addition to specific position coordinates. The lane ID is a number for distinguishing a plurality of lanes having the same traveling direction from each other, and indicates the number of lanes counted from the right end or the left end of the road. The lane ID can also be referred to as a lane number. Here, as an example, it is assumed that numbers as lane IDs are allocated from the left side. Alternatively, as another configuration example, the lane number may be allocated from the right side.

In addition, the original map data may include a travel trajectory model. The travel trajectory model is equivalent to data indicating a traveling trajectory serving as a reference at a time of executing steering assistance or at a time of executing automated driving. The travel trajectory model can be, for example, trajectory data generated by statistically integrating travel trajectories of a plurality of vehicles. Specifically, it is possible to adopt a travel trajectory model obtained by averaging travel trajectories for each lane. Alternatively, the travel trajectory model may be calculated on the basis of road marking such as a division line without using actual travel trajectory data. Note that a steering assist function may be referred to as lane tracing assist (LTA) or lane trace control (LTC). The LTA and the LTC are equivalent to vehicle control as driving assistance that causes a host vehicle to travel along a lane or a trajectory of a preceding vehicle.

The above-described original map data is divided into a plurality of map tiles and managed, for example. Each of the map tiles is equivalent to map data of different regions in the real world. In other words, the map tiles mean a plurality of small regions obtained by dividing a map in accordance with a certain rule. The map tile can be rephrased as a mesh. Note that a management unit of the map data may be an administrative district unit such as a prefecture, city, town, or village, or may be another division unit. For example, the management unit may be a road link unit. The length of one side of the map tile can be, for example, 4 km. The size of one side of the map tile is not limited to 4 km, and may be 1 km, 2 km, or the like. The shape of the map tile is not required to be a rectangular shape. The map tile may be a hexagon, a circle, or the like. A tile ID as a unique ID is assigned to each map tile.

<Configuration of Map Server 1>

Figure 2:
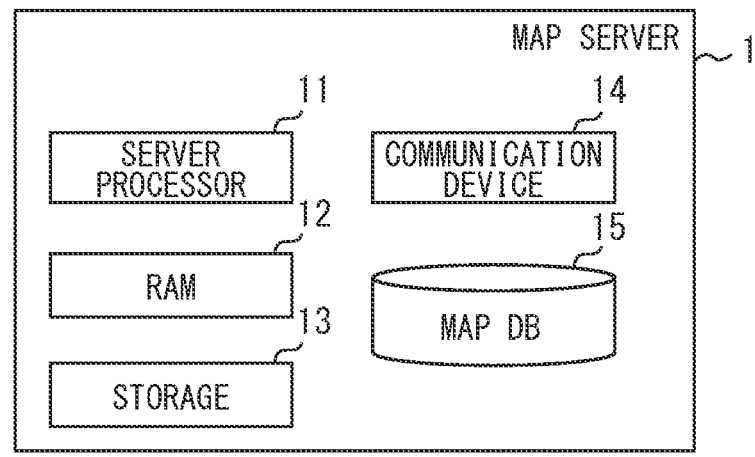
FIG. 2 is a block diagram showing a configuration of a map server.

Here, the configuration and operation of the map server 1 will be described. As shown in FIG. 2, the map server 1 includes a server processor 11, a random access memory (RAM) 12, a storage 13, a communication device 14, and a map DB 15. DB in the name of the member refers to a database. The server processor 11 is hardware for arithmetic processing coupled with the RAM 12. The server processor 11 includes at least one arithmetic core such as a central processing unit (CPU). The server processor 11 executes various processing such as updating of the map data by accessing the RAM 12. The storage 13 includes a nonvolatile storage medium such as a flash memory. The storage 13 stores a map distribution program which is a program executed by the server processor 11. Execution of the map distribution program by the server processor 11 is equivalent to execution of a part of a map distribution method and a vehicle control method corresponding to the map distribution program. The communication device 14 is a device for communicating with each of a plurality of vehicles via a wide range communication network. The vehicle in the present disclosure mainly refers to a vehicle equipped with the in-vehicle system 2.

Figure 3:
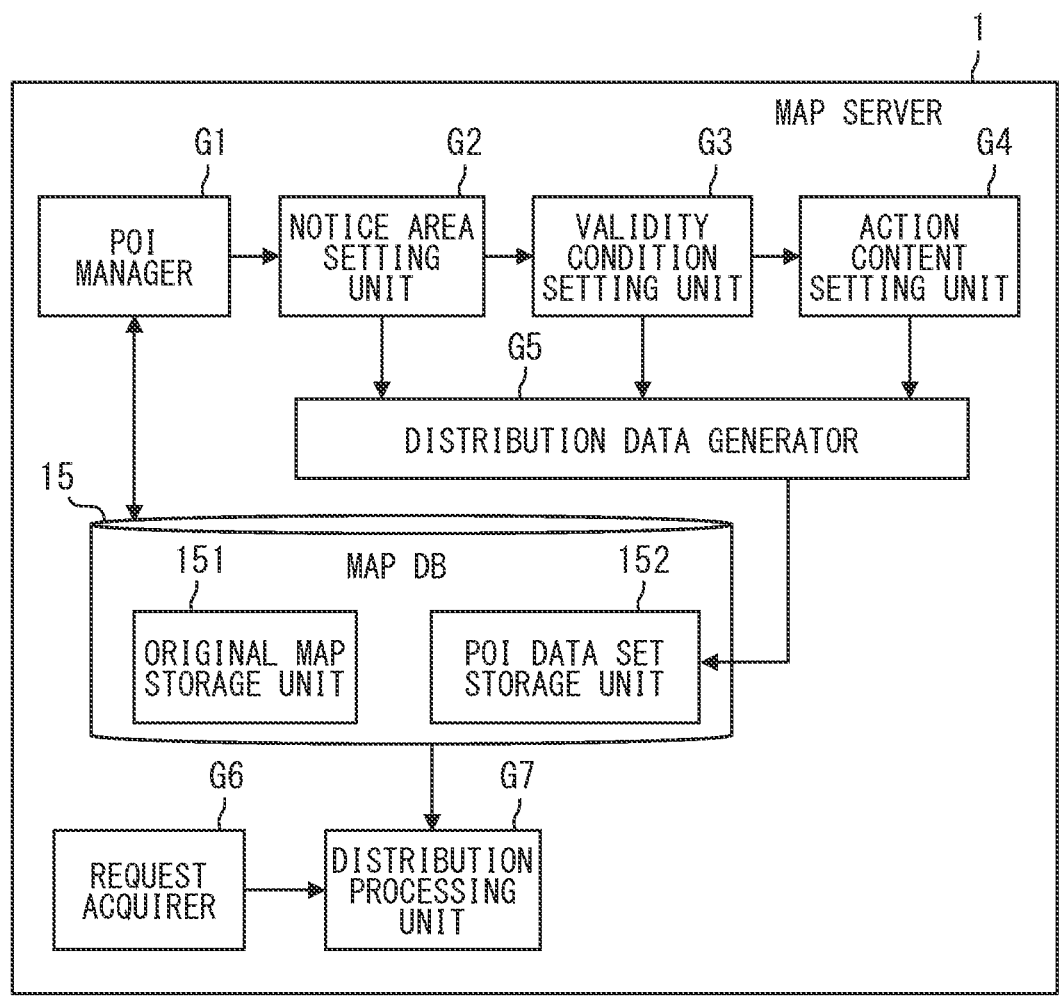
FIG. 3 is a functional block diagram of the map server.

The map DB 15 is a database that stores various map data. The map DB 15 is a database implemented by using a rewritable nonvolatile storage medium. The map DB 15 is configured such that data can be written, read, and deleted by the server processor 11. As shown in FIG. 3, the map DB 15 includes an original map storage unit 151 and a POI data set storage unit 152. The original map storage unit 151 and the POI data set storage unit 152 may be logically partitioned by a technique such as partitioning or may be physically independent.

The original map storage unit 151 is a storage region that stores the above-described original map data. The original map data stored in the original map storage unit 151 is used when a notice area setting unit G2 to be described later sets a notice area An and a validity condition setting unit G3 determines a validity condition. The POI data set storage unit 152 is a storage region that stores a data set for distribution generated for each POI.

The map server 1 provides functions corresponding to various functional blocks shown in FIG. 3 by the server processor 11 executing the map distribution program stored in the storage 13. That is, the map server 1 includes, as functional blocks, the POI manager G1, the notice area setting unit G2, the validity condition setting unit G3, an action content setting unit G4, a distribution data generator G5, a request acquirer G6, and a distribution processing unit G7.

The POI manager G1 is configured to set and cancel various POIs. The POI manager G1 sets the static POI on the basis of a predetermined setting rule with reference to, for example, a road structure or the like indicated in the original map data or an installation position of a predetermined traffic or pavement sign. For example, as shown in (A) of FIG. 4, a static POI indicating a merging point is assigned to a start point, an end point, or an intermediate point of a connection section between a highway and an acceleration lane. In addition, just before a sharp curve as shown in (B) of FIG. 4, a static POI indicating a start point of the sharp curve is set. Here, the sharp curve refers to a road section whose curvature is greater than or equal to a predetermined threshold value. The threshold value for the curvature to be regarded as a sharp curve can be changed in accordance with a speed limit of the section. The sharp curve also includes a curve having no clothoid section.

Figure 4:
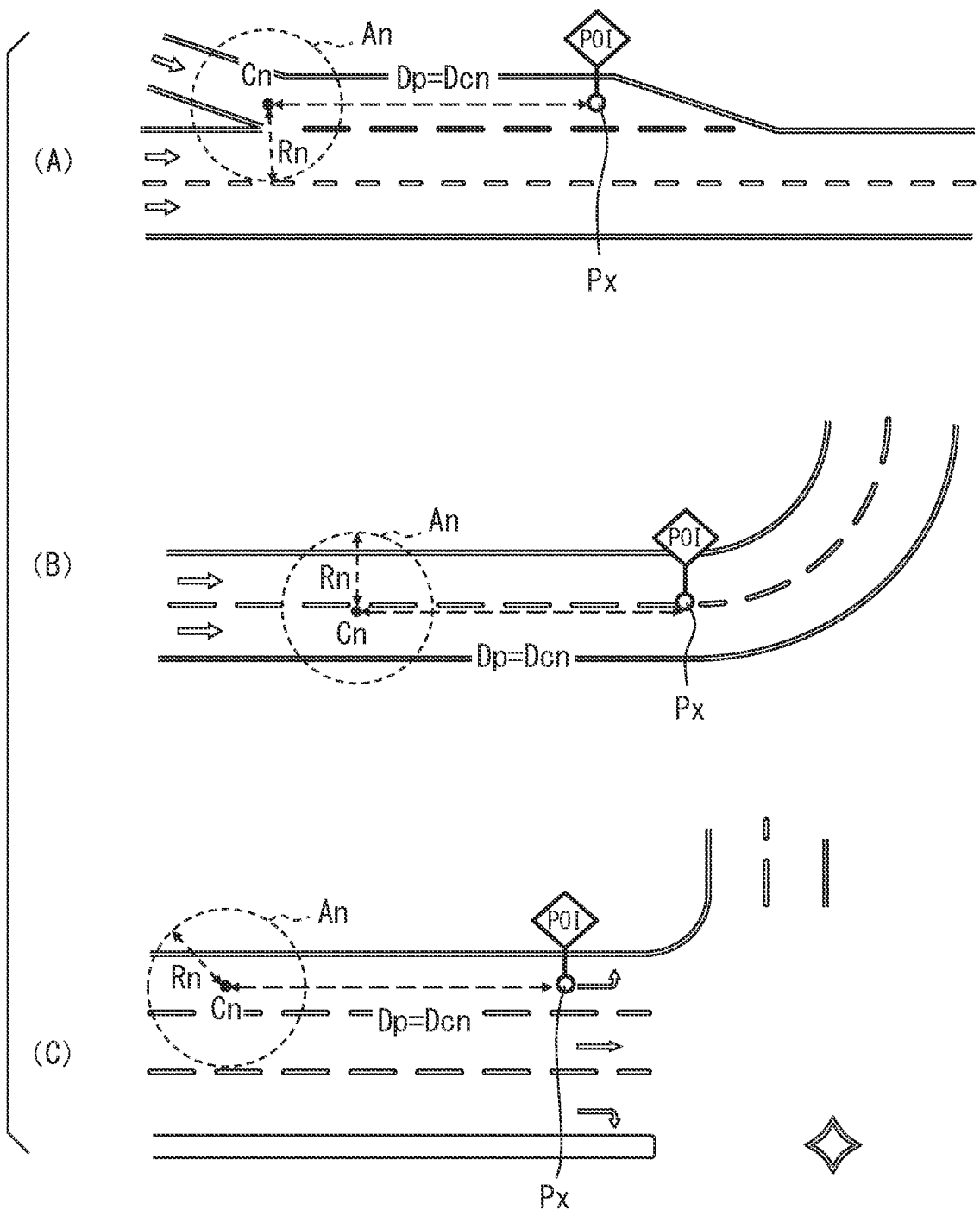
FIG. 4 is a diagram showing an installation example of a notice area.

In addition, a static POI according to each category may be set at a tollgate, a tunnel entrance or exit, a speed limit change point, a sharp curve, a temporary stop position, a gradient change point, a specific sign installation location, a railroad crossing, a crosswalk, or the like. Furthermore, for example, a lane change point as the static POI may be set at a predetermined distance backward in a traveling direction from a point where the number of lanes decreases. The lane change point as the static POI can be set in accordance with the traveling direction. In addition, as illustrated in (C) of FIG. 4, an intersection connection point of the right-turn lane or the left-turn lane may be registered as the static POI. Which point is registered as the static POI can be changed as appropriate. It is preferable to set, as the static POI, a point that affects the travel control of the vehicle and has a feature that is difficult or unrecognizable only by image recognition of a camera or the like. Note that white arrows in FIG. 4 and the like represent traveling directions for each lane. FIG. 4 and the like do not show a road having an opposite traveling direction, such as an opposing lane.

In addition, the POI manager G1 sets a dynamic POI for a point where an obstacle exists or an end of a traffic jam. The obstacle here is, for example, a falling object, a parked or stopped vehicle, a failed vehicle, a wild animal, or the like. The point where the obstacle exists may be specified based on a report from the user, or may be specified by analyzing image recognition results in a plurality of vehicles or motions of a plurality of vehicles. The end of the traffic jam can be specified from motions of a plurality of vehicles. The motions here include a vehicle speed, presence or absence of a lane change, a traveling trajectory, an operation state of a direction indicator, a lighting state of a hazard lamp, and the like. Some POIs may be manually registered and deleted by a staff managing the map. The map server 1 may be configured to be able to register and delete POIs based on a signal from an input device (not shown). The POI manager G1 is equivalent to a configuration that specifies the position of the point where the POI actually exists and the category of the point on the basis of the road structure and the like. Therefore, the POI manager G1 is equivalent to a point-of-interest acquirer.

As shown in (A) to (C) of FIG. 4, the notice area setting unit G2 sets the notice area An at a predetermined preparation distance Dp backward from a real point Px which is the point where each POI actually exists. Here, "backward" means a direction opposite to the traveling direction. The preparation distance Dp can be, for example, 2000 m, 1500 m, or 1000 m. Alternatively, the preparation distance may be 500 m, 250 m, 150 m, or the like. The preparation distance Dp may be set to a different value in accordance with the category of the POI. In addition, the preparation distance Dp may be adjusted in accordance with a road structure around the POI or a road category for which the POI is set.

The notice area An is an area for causing the vehicle to recognize presence of a POI. In other words, the notice area An is equivalent to an area where the map server 1 notifies the vehicle in advance of the presence of the POI. The notice area An can also be referred to as a POI notification area. In addition, the notice area An can be understood as an area for detecting a POI that exists ahead of the vehicle and for starting to verify whether to execute vehicle control according to the category of the POI for the POI corresponding to the notice area An.

The notice area An can be expressed by, for example, position coordinates of a center Cn and a radius Rn. The installation position of the notice area An in a road width direction can be changed in accordance with a type of the POI. The notice area setting unit G2 may arrange the center Cn of the notice area An of a POI of a type such as an obstacle that affects not all lanes but only a specific lane, on the lane. In a case where the category of the POI is a type of POI that affects the entire road regardless of a traveling lane, such as a curve start point, the notice area setting unit G2 may arrange the center of the notice area An at the center in the width direction of the road. For convenience, here, among various POIs, a POI of a type that affects only vehicles traveling on some lanes is also referred to as a local POI. The local POI is, for example, a left-turn or right-turn lane, a depressed point, a lane disappearance point, and the like in addition to an obstacle. The POI that affects the entire road regardless of the traveling lane is also referred to as an entire POI. The entire POI is an entrance and exit of a tunnel, a gradient change point, a tollgate, and the like in addition to the curve start point. Note that the end of a traffic jam is the entire POI when the map server 1 specifies a traffic jam section on a road basis, whereas the end of a traffic jam can be the local POI when a traffic jam section is specified on a lane basis. For example, when only the right-turn or left-turn lane is congested and a straight lane is vacant, the local POI as the end of the traffic jam can be set only to the right-turn or left-turn lane in which the traffic jam occurs.

The installation position of the notice area An in a road extending direction with respect to a real location of the POI is defined by the preparation distance Dp. The preparation distance Dp described above can be, for example, a distance from the center Cn of the notice area An to the POI.

Here, the radius Rn of the notice area An is also referred to as an area radius Rn. The area radius Rn can be set to, for example, 10 m, 15 m, or the like. The area radius Rn may be 5 m or the like. The area radius Rn may be set to a different value in accordance with the category of the POI. In addition, the area radius Rn may be adjusted in accordance with a road structure around the POI or a road category for which the POI is set.

Furthermore, the area radius Rn may be set in consideration of a positioning error of a global navigation satellite system (GNSS) or the like. The area radius Rn in a section under an open sky environment is set to a relatively small value such as 5 m, for example, and the area radius Rn in a multipath environment is set to a relatively large value such as 15 m, for example. Note that the open sky environment here is an environment in which there is no multipath factor such as a high-rise building. The open sky environment can quantitatively be, for example, an environment in which a sky ratio (in other words, a sky factor) when the sky is photographed with a fisheye camera is 75% or more. Information regarding positioning accuracy for each point, such as whether it is under the open sky environment, may be registered on the basis of the map data or may be registered on the basis of a report from the vehicle. As described above, the size of the notice area An can be appropriately changed in accordance with the environment, the POI category, and the road category. Furthermore, as separately described later, the area radius Rn distributed by the map server 1 may be dynamically adjusted and used in the vehicle.

Note that the shape of the notice area An is not limited to a circular shape. The shape of the notice area An may be a long ellipse. In that case, the position of the notice area An may be expressed by center coordinates, a long radius, or a short radius. In a case where the notice area An has a long elliptical shape, a longitudinal direction of the notice area An in the vehicle is only required to be interpreted as a direction in which the road extends. In addition, the notice area An may be rectangular or the like. A boundary of the notice area An may be expressed by a coordinate point group. For example, in a case where the notice area An has a rectangular shape, the boundary of the notice area An may be expressed by position coordinates of four corners.

The validity condition setting unit G3 sets a validity condition for each POI, and the validity condition indicates a vehicle to be affected by the POI. The vehicle to be affected by the POI can be referred to as a target vehicle of the POI. The validity condition is equivalent to target vehicle information indicating a condition of the vehicle affected by the POI. In addition, the validity condition is equivalent to a condition for distinguishing a vehicle that needs to perform a system action against the POI and a vehicle that does not. For example, the lane ID, the speed, traveling direction, and the like can be adopted as items constituting the validity condition.

By using the lane ID as the validity condition, when the POI is involved only with the vehicle traveling on some of the lanes, a vehicle traveling on a lane unrelated to the POI can be prevented from acting against the POI. For example, when a falling object is on a second lane and the point of the falling object is set as a POI, the vehicle affected by the POI is a vehicle traveling on the second lane. In such a case, by setting the lane ID of the validity condition to "2" (that is, the second lane), it is possible to reduce a possibility of causing the vehicle traveling on a first lane or a third lane to notify the falling object or change the lane to avoid the falling object.

In addition, by including a traveling speed of the vehicle as the validity condition, for example, in a section where a general road is provided near the highway, it is possible to separate a vehicle traveling on the highway and a vehicle traveling on the general road. The reason is that a vehicle traveling on the highway and a vehicle traveling on the general road can be expected to have greatly different speeds. For example, by providing a condition that the traveling speed is 70 km/h or more as the validity condition, only vehicles traveling on the highway can be targets. Accordingly, it is possible to reduce a risk that a vehicle traveling on the general road responds to a POI on the highway.

Furthermore, by including the traveling direction of the vehicle as the validity condition, it is possible to separate a vehicle traveling in a certain direction and a vehicle traveling in another direction such as an opposite direction. For example, it is possible to reduce a possibility that a vehicle traveling in the opposite lane responds to a POI assigned to a certain lane. Note that the traveling direction may be defined by an azimuth angle or may be expressed by an angle with respect to the road extending direction. Alternatively, the traveling direction may be defined by area information equivalent to a destination of a road. The area information may be specified by image recognition of text written on an area signboard or the like, or may be acquired wirelessly from a roadside device such as a beacon.

In addition, as the validity condition, a function equipped with the vehicle, such as a vehicle model and whether the vehicle is capable of automated driving, can be adopted. Here, the vehicle model indicates whether the vehicle is a large vehicle such as a truck or a trailer, a passenger vehicle, or the like. By including the vehicle model as the validity condition, for example, only a large vehicle can recognize the POI indicating a climbing lane. In addition, by including the equipped function of automated driving or driving support as the validity condition, it is possible to cause only the vehicle concerned to recognize a POI indicating a start point of a section where automated driving is possible, for example.

Note that items other than the above can also be adopted as the validity conditions. In addition, it is not necessary to adopt all the items described above as the validity conditions. Only some of the above may be set as the validity conditions. The validity condition setting unit G3 is equivalent to a target vehicle setting unit.

The action content setting unit G4 is configured to set a content of the system action to be executed by the vehicle in accordance with the POI category. The content of the system action is automatically determined by the server processor 11 as the action content setting unit G4 executing predetermined software on the basis of a category of a target POI, the road structure around the target POI, and the like. Alternatively, the content of the system action may be set by a staff who performs maintenance of the map on the basis of the category of the target POI, the road structure around the target POI, and the like.

The concept of the system action here includes not only substantial vehicle control such as deceleration and lane change, but also internal arithmetic processing such as creation of a control plan for deceleration and lane change. Furthermore, the concept of the vehicle control includes notification to the user via an HMI system 25, wireless transmission of predetermined data to an external device or another vehicle, and the like.

As the system action against the POI, for example, lane change, speed adjustment, correction of a planned traveling trajectory, information presentation to the user, and the like can be adopted. Note that the information presentation to the user refers to outputting at least one of an image or a sound according to the category of the POI or the like from a notification device such as a display or a speaker. The presentation of the POI information to the user can be read as POI notification processing. The POI notification processing may be processing of notifying the occupant of information according to the category of the POI. The POI notification processing may be, for example, processing of notifying the presence or the category of the POI or processing of suggesting a control content corresponding to the category of the POI.

For example, the action content setting unit G4 sets lane change, correction of the planned traveling trajectory, and the like as the action content against the POI such as an obstacle. In a case where the category of the POI is a lane number decrease point, a merging point, a branch point, or the like, a lane change may be set as the system action. The action content setting unit G4 sets speed adjustment (deceleration) as the action content against the POI at a sharp curve start point. The speed adjustment (acceleration) can also be set for the POI indicating the merging point to a high-speed main line. In addition, information presentation to the user can be appropriately set in accordance with the category of the POI.

The action content according to the category of the POI determined by the action content setting unit G4 is referred by the distribution data generator G5. In the present embodiment, it is assumed that the map server 1 sets the action content against each POI and then distributes the action content to the vehicle together with the validity condition and the like, but the present invention is not limited thereto. The action content against each POI may be determined by the vehicle in accordance with the category of the POI. Alternatively, the action content itself such as a lane change may be set as the category of POI.

The distribution data generator G5 stores the notice area An, the validity condition, the content of the system action, and the POI information for each POI in the map DB 15 in association with each other. For example, the distribution data generator G5 generates and stores, for each POI, a POI data set in which the notice area An, the validity condition, and the POI information for each POI are packaged.

FIG. 5 shows an example of a configuration of the POI data set. The data configuration shown in FIG. 5 is equivalent to an example of a map data structure including information regarding a POI in travel control. The POI data set includes, for example, area position data D1 indicating the position of a notice area and the like, and POI-related data D2 including data on the POI corresponding to the notice area An. The area position data D1 includes center position coordinates and the area radius Rn of the notice area An. For convenience, a data region corresponding to the area position data a1 in the POI data set is also referred to as an area position field Fd0.

In one aspect, the POI-related data D2 is equivalent to reference information for planning and executing the travel control for the POI. For example, the POI-related data D2 includes a remaining distance field Fd1, a POI category field Fd2, a validity condition field Fd3, an action timing field Fd4, an action content field Fd5, and a supplementary field Fd6. Each field has a predetermined bit length. Note that character strings in parentheses in FIG. 5 each represent an example of each item.

The remaining distance field Fd1 is a data field that stores an initial remaining distance Dcn which is a distance from the area center Cn to the POI. The initial remaining distance Dcn can also be referred to as a center distance. Note that the initial remaining distance Dcn stored in the remaining distance field can function as information indirectly indicating the position of the POI. The initial remaining distance Dcn is a so-called road distance along the road. The initial remaining distance Dcn is equivalent to the preparation distance Dp described above.

The POI category field Fd2 is a data field that stores information indicating the category of POI. The category of the POI may be expressed by a unique code or number for each category, or may be expressed by text. The validity condition field Fd3 is a data field that stores a validity condition. The item stored in the validity condition field may be different for each POI. The validity condition field Fd3 is equivalent to a target vehicle field.

The action timing field Fd4 is a data field that stores information specifying an action start timing which is a timing at which vehicle control according to the POI is to be started. The vehicle control according to the POI can be read as the system action against the POI. The action start timing is represented by, for example, a remaining distance to the POI. Note that the action start timing may be expressed by, for example, the remaining time until arrival at the POI. Alternatively, the action start timing may be expressed by, for example, an elapsed time or a travel distance after passing through the notice area An.

The action content field Fd5 is a data field that stores information indicating a system action to be executed at the action start timing. The supplementary field Fd6 is a data field that stores a parameter for executing the system action set in the action content field and supplementary information regarding the POI. The supplementary field Fd6 is equivalent to a control target field.

For example, in a case where the action content set by the action content setting unit G4 for a certain POI is a lane change, recommended lane information such as a lane ID to be a transition destination or a direction (right or left) in which the lane change is to be performed is set in the supplementary field Fd6. The lane ID to be the transition destination can also be referred to as a target lane.

In a case where the action content set by the action content setting unit G4 for a certain POI is speed adjustment, information regarding an upper limit value or a lower limit value of a target speed at the time of passing through the POI is inserted into the supplementary field Fd6. Furthermore, in a case where the system action against the POI is speed adjustment, the supplementary field Fd6 may include acceleration or deceleration to be applied. The acceleration and deceleration to be applied are preferably set to 2.0 m/sec$^\wedge$2≈0.2 G or less in order to reduce the risk of giving discomfort to the occupant. The concept of speed adjustment also includes processing of creating a control plan for accelerating or decelerating to a predetermined target speed.

In a case where the system action against the POI is speed adjustment in a direction of decreasing the speed, a value set in the action timing field Fd4 of the vehicle is preferably interpreted as a position at which arithmetic processing for determining a deceleration start point is started. The deceleration start point refers to a point where deceleration starts. In a case where the deceleration is set to a constant value, the deceleration start point can be different every time in accordance with the actual traveling speed or the target speed. In view of such circumstances, the remaining distance for starting the arithmetic processing for determining the deceleration start point is designated as the action start timing, and then a control plan for smoothly decelerating to the target speed at a desired deceleration can be created. The position information for starting a calculation for determining a deceleration start position may be included in the POI-related data as supplementary information.

For example, the action content setting unit G4 sets an arithmetic start position for determining the deceleration start position for the POI of a curve in which the clothoid section is less than or equal to a predetermined threshold value (for example, 100 m), and includes the arithmetic start position in the POI-related data. The curve in which the clothoid section is equal to or less than the predetermined threshold value can be said to be a section that is difficult to control and likely to deteriorate ride comfort. The curve in which the clothoid section is equal to or less than the predetermined threshold value is conceptually equivalent to a curve in which the length of the clothoid section is insufficient with respect to the target speed at the curve start point. The curve in which the clothoid section is equal to or less than the predetermined threshold value includes a curve having no clothoid section. For such a curve, it is possible to maintain or improve safety and user comfort by setting the arithmetic start position for determining the deceleration start position. The POI-related data for a curve in which the clothoid section is sufficiently provided or a curve in which a curvature is equal to or less than a predetermined value may also include arithmetic start point information for determining the deceleration start point.

In the above description, a case has been described, as an example, where the system action against the POI is the speed adjustment in the direction of decreasing the speed. However, the same can be applied to a case where the system action against the POI is the speed adjustment in a direction of increasing the speed. As another aspect, in a case where the system action against the POI is speed adjustment, a value indicating a point where the speed adjustment is started may be also set in the action timing field Fd4. In that case, the acceleration or deceleration is dynamically determined in accordance with the actual traveling speed and the target speed.

In addition, in a case where the system action against the POI for an obstacle is avoidance of the obstacle, that is, correction of the planned traveling trajectory, trajectory determination data, which is data for determining the traveling trajectory for avoiding the obstacle, is stored in the supplementary field Fd6. The trajectory determination data may be a travel trajectory model indicating a trajectory on which the obstacle can be avoided. The travel trajectory model corresponding to the POI for the obstacle is only required to be determined on the basis of the travel trajectory data of the vehicle collected after a time point at which the presence of the obstacle is detected. Note that the travel trajectory model corresponding to the POI for the obstacle may be calculated by the server processor 11 on the basis of a road shape and a position and size of the obstacle.

The trajectory determination data may be virtual road edge data which is data indicating position information of a virtual road edge. The virtual road edge data is equivalent to data indicating a range in which the vehicle can travel. Furthermore, the trajectory determination data may be virtual division line data indicating a position of a virtual division line. A virtual road edge and virtual division line as the trajectory determination data corresponding to the POI for the obstacle are set, for example, in a curved shape that avoids the obstacle. For example, the virtual road edge and the virtual division line for avoiding the obstacle are preferably set by using a clothoid curve. The virtual road edge data and the virtual division line data are equivalent to data indicating a virtual road shape.

Furthermore, a plurality of items may be set in parallel as the system action against the POI. For example, two items of speed adjustment and POI information presentation to the user may be set as the system action against one POI. In such a case, the POI data set is only required to include the action timing field Fd4, the action content field Fd5, and the supplementary field Fd6 corresponding to the speed adjustment and the presentation of the POI information to the user. That is, the POI data set may include the action timing field Fd4, the action content field Fd5, and the supplementary field Fd6 as many as the number of system actions to be executed.

In addition, the POI data set may include specific position coordinates of the POI. The configuration of the POI data set, in other words, a combination of items included in the POI data set can be appropriately changed in accordance with the category of POI or the like.

The data set for each POI generated by the distribution data generator G5 can be stored separately for each map tile which is a predetermined management unit, for example. The size of the map tile managed by the POI data may be the same as or smaller than the size of the map tile of the original map data. The POI data set may be stored in association with the POI data in the original map data.

The request acquirer G6 is configured to receive a distribution request for map data from the vehicle. For example, the vehicle requests the map server 1 for map data regarding an area corresponding to the current position or an area scheduled to travel within a predetermined time. On the basis of the request from the vehicle acquired by the request acquirer G6, the distribution processing unit G7 distributes distribution map data, which is map data for distribution, in a predetermined distribution unit such as a map tile. Note that the distribution processing unit G7 may be configured to voluntarily distribute the distribution map data.

The distribution map data, which is map data distributed by the distribution processing unit G7, includes, for example, POI-related data for each POI, whereas the distribution map data does not include network data. Such a configuration can reduce an amount of communication of map data exchanged between the map server 1 and the vehicle. The distribution map data may include data of landmarks existing within a predetermined related distance from the notice area An. The data-related distance can be, for example, 50 m, 100 m, or the like. Landmark information included in the distribution map data is preferably information regarding a landmark existing backward of the notice area An. This configuration can execute localization processing to be immediately before entering the notice area An, and enhance position estimation accuracy in the vehicle. As a result, determination accuracy regarding entry and exit of the notice area An can be improved. In addition, the distribution map data may include landmark information existing between the notice area An and the POI.

<Operation of Map Server 1>

Figure 6:
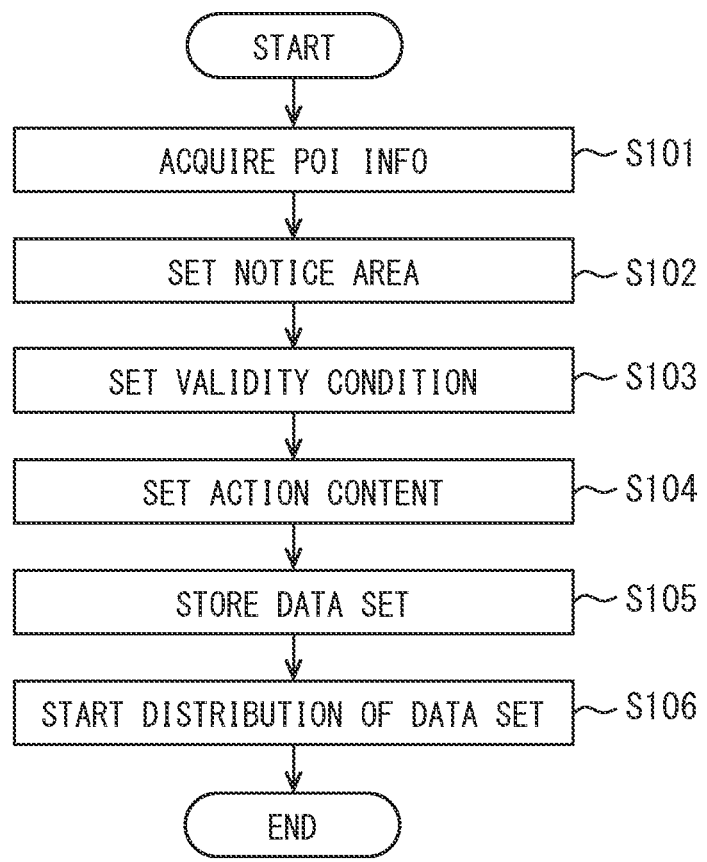
FIG. 6 is a flowchart of POI information distribution-related processing performed by the map server.

POI information distribution-related processing, which is a series of processing related to the generation and distribution of the distribution map including the POI data set performed by the map server 1, will be described with reference to a flowchart shown in FIG. 6. The flowchart shown in FIG. 6 may be executed in a predetermined update cycle, for example. The update cycle may be, for example, 10 minutes, 30 minutes, or the like, or may be one day or the like. Furthermore, the POI information distribution-related processing may be triggered by a new registration of the POI. The POI information distribution-related processing according to the present embodiment includes steps S101 to S106 as an example. Steps S101 to S106 are performed for each POI. Note that the number of steps and a processing procedure included in the POI information distribution-related processing can be changed as appropriate.

First, in step S101, the POI manager G1 acquires the position and the category of the POI from the original map data. Then, information regarding the POI for which the notice area An or the like has not yet been set is output to the notice area setting unit G2 or the like. As a result, for example, the notice area setting unit G2 acquires the position and the category of the POI for which the notice area An is not yet set, such as the POI newly registered by the POI manager G1. Then, the POI is set as a processing target, and the processing proceeds to step S102. Step S101 can be referred to as a point-of-interest acquisition step.

In step S102, the notice area setting unit G2 sets the notice area An for the target POI in an area at the predetermined preparation distance Dp backward from the real point Px of the target POI along the road. As described above, parameters such as the preparation distance Dp and the area radius Rn can be adjusted on the basis of the road structure around the target POI, the road category, the positioning accuracy of the GNSS, and the like. Alternatively, the parameters such as the preparation distance Dp and the area radius Rn may be constant values. The notice area An is set so as to cover at least the lane affected by the target POI in a road section at the preparation distance Dp backward from the target POI. When the processing of step S102 ends, the processing proceeds to step S103. Step S102 can be referred to as a notice area setting step.

In step S103, the validity condition setting unit G3 sets the validity condition of the target POI on the basis of the category of the target POI, the ID of the lane in which the target POI exists, the road structure around the target POI, and the like. For example, when there is a road with a different speed limit near the target POI, the condition regarding speed is set. In addition, in a case where the target POI is near an intersection, a condition regarding the traveling direction is set. Furthermore, a lane ID affected by at least the target POI is set as a condition regarding the lane ID. Note that, in a case where the type of the target POI affects a plurality of lanes, IDs of all the lanes affected by the POI are set as the lane ID serving as the validity condition. In a case where the type of the target POI is the entire POI such as a sharp curve start point, a code indicating that all the lanes are targets is inserted into the lane ID serving as the validity condition. When the processing of step S103 ends, the processing proceeds to step S104. Step S103 can be referred to as a target vehicle setting step.

In step S104, the action content setting unit G4 sets the content of action against the target POI on the basis of the category of the target POI and the like, and the processing proceeds to step S105. Note that the content of action against each POI may be determined by the vehicle in accordance with the category of the POI as described above. Step S104 can be omitted. However, even in a case where the vehicle determines the specific action content against the POI, the trajectory determination data, a recommended lane to be a lane change destination, and information such as the target speed at a time of passing the POI are distributed in association with the validity condition as supplementary information regarding the POI. Step S104 can be referred to as an action content setting step.

In step S105, the distribution data generator G5 stores the above-described data in association with each other. More specifically, the distribution data generator G5 generates the POI data set for the target POI by using the validity condition and the like set above for the target POI, and stores the POI data set in the POI data set storage unit 152. Note that the supplementary information is assigned by, for example, the distribution data generator G5 on the basis of one of the category of the POI or the action content. Alternatively, the supplementary information may be assigned by the action content setting unit G4 or the like. A function arrangement in the map server 1 can be changed as appropriate.

When the processing of step S105 ends, the processing proceeds to step S106. When there is still an unprocessed POI, the unprocessed POI is set as the target POI, and steps S102 to S105 are performed. Step S105 can be referred to as a POI data set generation step.

In step S106, the distribution processing unit G7 distributes, as map data of a requested area, a data set including a POI data set and landmark data for a POI existing in the area on the basis of a distribution request from the vehicle. Note that the map data to be distributed may be only the POI data set. Step S106 can be referred to as a distribution processing step.

<Configuration of In-Vehicle System 2>

Figure 7:
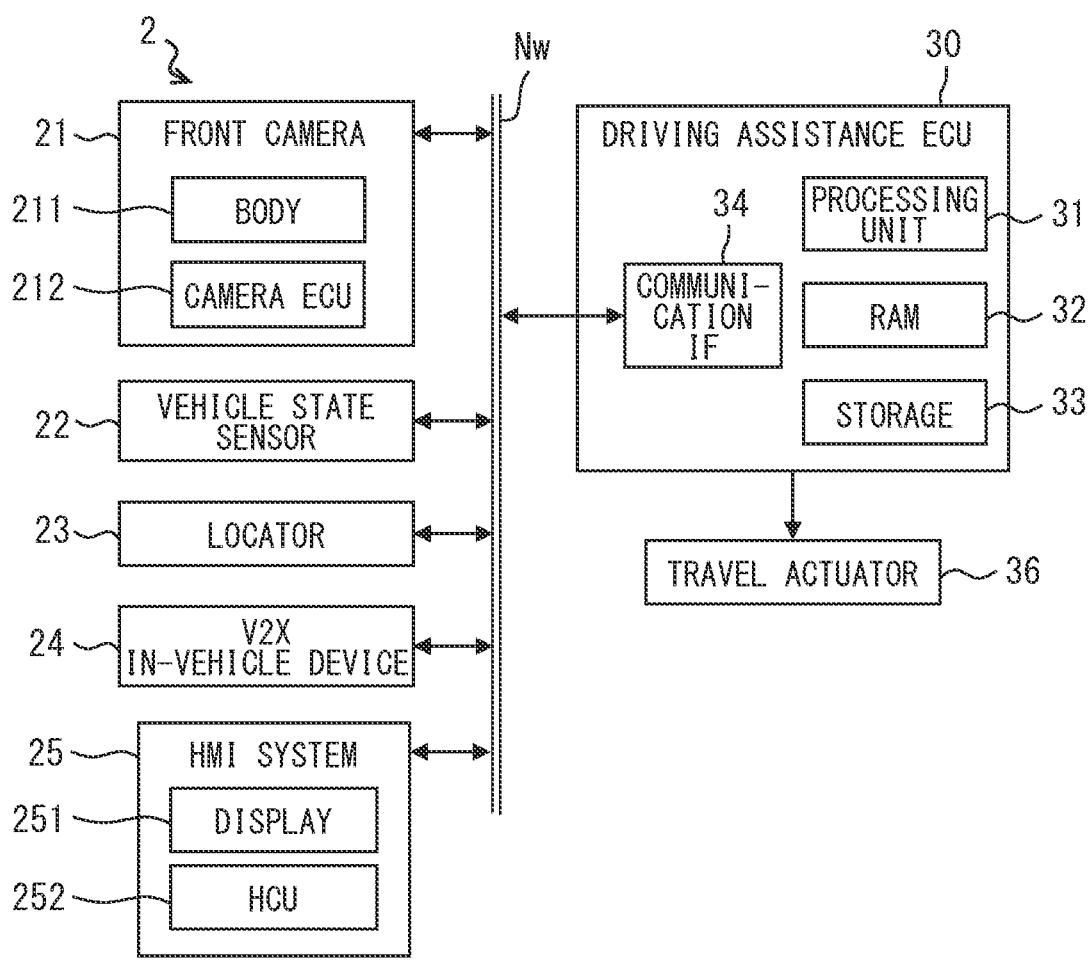
FIG. 7 is a block diagram showing a configuration of an in-vehicle system.

Here, a configuration of the in-vehicle system 2 will be described. As shown in FIG. 7, the in-vehicle system 2 includes the front camera 21, a vehicle state sensor 22, a locator 23, a V2X in-vehicle device 24, the HMI system 25, a travel actuator 26, and a driving assistance ECU 30. The ECU in the name of the member is an abbreviation of an electronic control unit and means an electronic control device. HMI stands for human machine interface. V2X is an abbreviation of vehicle to X, and refers to a communication technology that connects vehicles with various things. Note that the first character "V" of V2X may mean an automobile as a host vehicle, and "X" may mean various entities other than the host vehicle, such as pedestrians, other vehicles, road facilities, networks, and servers. "X" can be understood as everything or something.

The above-described various devices or sensors constituting the in-vehicle system 2 are connected, as nodes, to an in-vehicle network Nw which is a communication network constructed in the vehicle. The nodes connected to the in-vehicle network Nw can communicate with each other. Note that the specific devices may be configured to be able to directly communicate with each other without passing through the in-vehicle network Nw. In FIG. 7, the in-vehicle network Nw is configured as a form of bus, but is not limited this form. A network topology may be a form of mesh, star, ring, or the like. As a standard of the in-vehicle network Nw, for example, various standards such as a controller area network (CAN™, a registered trademark), Ethernet™ (registered trademark), and FlexRay™ (registered trademark) can be adopted.

The front camera 21 is a camera that captures an image of the front of the vehicle at a predetermined angle of view. The front camera 21 is disposed at, for example, an upper end of a windshield inside a vehicle compartment, a front grille, a roof top, or the like. The front camera 21 includes a camera body 211 that generates an image frame, and a camera ECU 212 that detects a predetermined detection subject by performing recognition processing on the image frame generated by camera body 211. The camera body 211 includes at least an image sensor and a lens. The camera body 211 generates and outputs captured image data at a predetermined frame rate (for example, 60 fps). The camera ECU 212 is mainly configured by an image processing chip including a CPU, a graphics processing unit (GPU), and the like, and includes an identification device as a functional block. The identification device is configured to identify a category of an object on the basis of a feature quantity vector of the image generated by the camera body 211. The identification device identifies an object by using, for example, convolutional neural network (CNN) or deep neural network (DNN) technology to which deep learning is applied.

The detection subject of the front camera 21 includes, for example, a mobile body such as a pedestrian or another vehicle. Another vehicle includes a bicycle, a motorcycle, and a motorcycle. In addition, the front camera 21 is configured to be able to detect a predetermined feature. The feature to be detected by the front camera 21 includes a road edge, road marking, and a structure installed along the road. The road marking includes a division line, a temporary stop line, and the like. The structure installed along the road is, for example, a guardrail, a curb, a tree, a utility pole, a traffic sign, a traffic light, or the like.

Note that some or all of the features to be detected by the front camera 21 is used as a landmark in driving assistance ECU 30. The landmark in the present disclosure refers to a feature that can be used as a mark for estimating the position of the vehicle on the map. The category of the feature used as the landmark can be changed as appropriate. The landmark can be divided into a landmark for longitudinal position estimation and a landmark for lateral position estimation described later. The landmark used for the longitudinal position estimation is, for example, a traffic sign such as an area signboard or road marking. As the landmark used for the longitudinal position estimation, it is preferable to adopt a feature having a small temporal change and having a size that allows image recognition even from a point 30 m or more away. The landmark used for the lateral position estimation is, for example, a division line or a road edge. The front camera 21 is only required to be able to detect the feature of the category set in the landmark, in addition to various mobile bodies.

Note that the camera ECU 212 separates and extracts the background and the detection subject from the captured image on the basis of image information including color, luminance, contrast related to the color and luminance, and the like. In addition, the camera ECU 212 calculates the position and direction of various detection subjects from an image including structure from motion (SfM) information. A relative position (distance and direction) of a detection object with respect to the host vehicle may be specified on the basis of the size and orientation (for example, inclination degree) of the subject in the image. Furthermore, the camera ECU 212 recognizes a curvature, a width, and the like of a road on the basis of a regression curve of a detection point indicating a lane division line and a road edge.

The camera ECU 212 outputs a signal indicating a relative position, a category, a moving speed, and the like of each detected object as a detection result. The detection result of the front camera 21 can also be read as a recognition result or an identification result. Note that front camera 21 may be configured to provide the image frame used for the object recognition to the driving assistance ECU 30 or the like via the in-vehicle network Nw. The image frame is equivalent to observation data for the front camera 21. The observation data is equivalent to raw data observed by the sensor or data before the recognition processing is executed. Note that object recognition processing based on the observation data may be executed by an ECU outside the sensor, such as the driving assistance ECU 30. For example, some of the functions of the camera ECU 212 (mainly an object recognition function) may be provided in the driving assistance ECU 30. In that case, the front camera 21 is only required to provide image data as observation data to the driving assistance ECU 30.

The vehicle state sensor 22 is a sensor group that detects a state quantity related to the travel control of the host vehicle. The vehicle state sensor 22 includes a vehicle speed sensor, a steering sensor, an acceleration sensor, a yaw rate sensor, an azimuth angle sensor, and the like. The vehicle speed sensor detects a vehicle speed of the host vehicle. The steering sensor detects a steering angle of the host vehicle. The acceleration sensor detects acceleration such as longitudinal acceleration and lateral acceleration of the host vehicle. The yaw rate sensor detects an angular velocity of the host vehicle. The azimuth angle sensor is a sensor that detects an azimuth angle corresponding to the traveling direction of the host vehicle. As the azimuth angle sensor, for example, a geomagnetic sensor can be adopted. Note that the kinds of the sensors used by the in-vehicle system 2 as the vehicle state sensor 22 are only required to be appropriately designed, and it is not necessary to include all the sensors described above.

The locator 23 is a device that generates highly accurate position information and the like of the host vehicle by complex positioning that combines a plurality of pieces of information. The locator 23 is configured by using, for example, a GNSS receiver. The GNSS receiver is a device that receives a navigation signal transmitted from a positioning satellite constituting a global navigation satellite system (GNSS) and thus sequentially detects a current position of the (GNSS) receiver. For example, in a case where the GNSS receiver can receive navigation signals from four or more positioning satellites, the GNSS receiver outputs a positioning result every 100 milliseconds. As the GNSS, GPS, GLONASS, Galileo, IRNSS, QZSS, Beidou, or the like can be adopted.

The locator 23 sequentially measures the position of the host vehicle by combining a measurement result of the GNSS receiver and output of an inertial sensor. For example, in a case where the GNSS receiver cannot receive a GNSS signal in a tunnel or the like, the locator 23 performs dead reckoning (that is, autonomous navigation) by using the yaw rate and the vehicle speed. The locator 23 may perform dead reckoning by using output of the acceleration sensor or a gyro sensor. The measured vehicle position information is output to the in-vehicle network Nw and used by the driving assistance ECU 30 and the like. Some of the functions of the locator 23 may be provided in the driving assistance ECU 30.

The V2X in-vehicle device 24 is a device for the host vehicle to perform wireless communication with another device. The V2X in-vehicle device 24 includes a wide range communicator and a short range communicator as communication modules. The wide range communicator is a communication module for performing wireless communication conforming to a predetermined wide-area wireless communication standard. As the wide-area wireless communication standard here, for example, various standards such as long term evolution (LTE), 4G, and 5G can be adopted. For example, a data communication module (DCM) can be adopted as the V2X in-vehicle device 24. The host vehicle, equipped with the V2X in-vehicle device 24, becomes a connected car connectable to the Internet. For example, the driving assistance ECU 30 can download map data corresponding to the current position from the map server 1 and use the map data in cooperation with the V2X in-vehicle device 24. Note that the wide range communicator may be configured to be able to perform wireless communication directly with another device, in other words, without passing through a base station, by a method conforming to the wide-area wireless communication standard, in addition to communication via a wireless base station. That is, the wide range communicator may be configured to perform cellular V2X.

The short range communicator included in the V2X in-vehicle device 24 is a communication module for directly performing wireless communication with other mobile bodies or roadside devices existing around the host vehicle in a mode conforming to a predetermined short range communication standard. The other mobile bodies are not limited to only a vehicle, and may include a pedestrian, a bicycle, and the like. The short range communication of the present disclosure refers to a communication standard in which a communicable distance is set to several tens of meters to several hundreds of meters. As the short range communication standard, any standard such as wireless access in vehicular environment (WAVE) standard disclosed in IEEE1509 or dedicated short range communications (DSRC) standard can be adopted. The roadside device is a communication device installed outside the vehicle, for example, along a road. Note that the V2X in-vehicle device 24 is not required to have a short range communication function.

The HMI system 25 is a system that provides an input interface function of receiving a user operation and an output interface function of presenting information to the user. The HMI system 25 includes a display 251 and an HMI control unit (HCU) 252 as notification devices that are means for presenting information to the user. As the notification device, a speaker, a vibrator, a lighting device (for example, an LED), or the like can be adopted instead of the display 251.

The display 251 is a device that displays an image. The display 251 is, for example, a so-called center display provided at the uppermost part of the center of an instrument panel in a vehicle width direction. The display 251 can display in full color, and can be implemented by using a liquid crystal display, an organic light emitting diode (OLED) display, a plasma display, or the like. The display 251 may be a head-up display that displays a virtual image on a part of the windshield in front of the driver's seat. The display 251 may be a meter display.

The HCU 252 is configured to integrally control information presentation to the user. The HCU 252 is implemented by using, for example, a processor such as a CPU or a GPU, a RAM, a flash memory, and the like. The HCU 252 controls a display screen of the display 251 on the basis of information provided from the driving assistance ECU 30 or a signal from an input device (not shown). For example, the HCU 252 displays an icon image indicating an execution state of driving assistance on the display 251 on the basis of a request from the driving assistance ECU 30. Note that a medium of information presentation to the user is not limited to the display 251. The HCU 252 may be configured to present information to the user by using a speaker or the like.

The travel actuators 26 are a kind of an actuator for travelling. The travel actuator 26 includes, for example, a brake actuator as a braking device, an electronic throttle, a steering actuator, and the like. The steering actuator also includes an electric power steering (EPS) motor. The travel actuator 26 is controlled by the driving assistance ECU 30. Note that a steering ECU that performs steering control, a power unit control ECU that performs acceleration and deceleration control, a brake ECU, and the like may be interposed between the driving assistance ECU 30 and the travel actuator.

The driving assistance ECU 30 is an ECU that assists a driving operation of the occupant in the driver's seat on the basis of the detection result of the front camera 21. For example, the driving assistance ECU 30 controls the travel actuator 26 on the basis of the detection result of the front camera 21 to execute a part or all of the driving operation instead of the occupant in the driver's seat. The driving assistance ECU 30 may be an automated driving device that causes the host vehicle to autonomously travel on the basis of an input of an instruction of autonomous traveling by the user.

The driving assistance ECU 30 is mainly configured by a computer including a processing unit 31, a RAM 32, a storage 33, a communication interface 34, a bus connecting these components, and the like. The processing unit 31 is hardware for arithmetic processing coupled with the RAM 32. The processing unit 31 includes an arithmetic core such as a CPU. The processing unit 31 executes various processing by accessing the RAM 32. The storage 33 includes a nonvolatile storage medium such as a flash memory. The storage 33 stores a driving assistance program as a program executed by the processing unit 31. Execution of the program by the processing unit 31 is equivalent to execution of a part of the vehicle control method corresponding to the driving assistance program. The communication interface 34 is a circuit for communicating with other devices via the in-vehicle network Nw. The communication interface 34 is only required to be implemented by using an analog circuit element, an IC, or the like. The driving assistance ECU 30 is equivalent to a vehicle-side device.

<Driving Assistance ECU 30>

Figure 8:
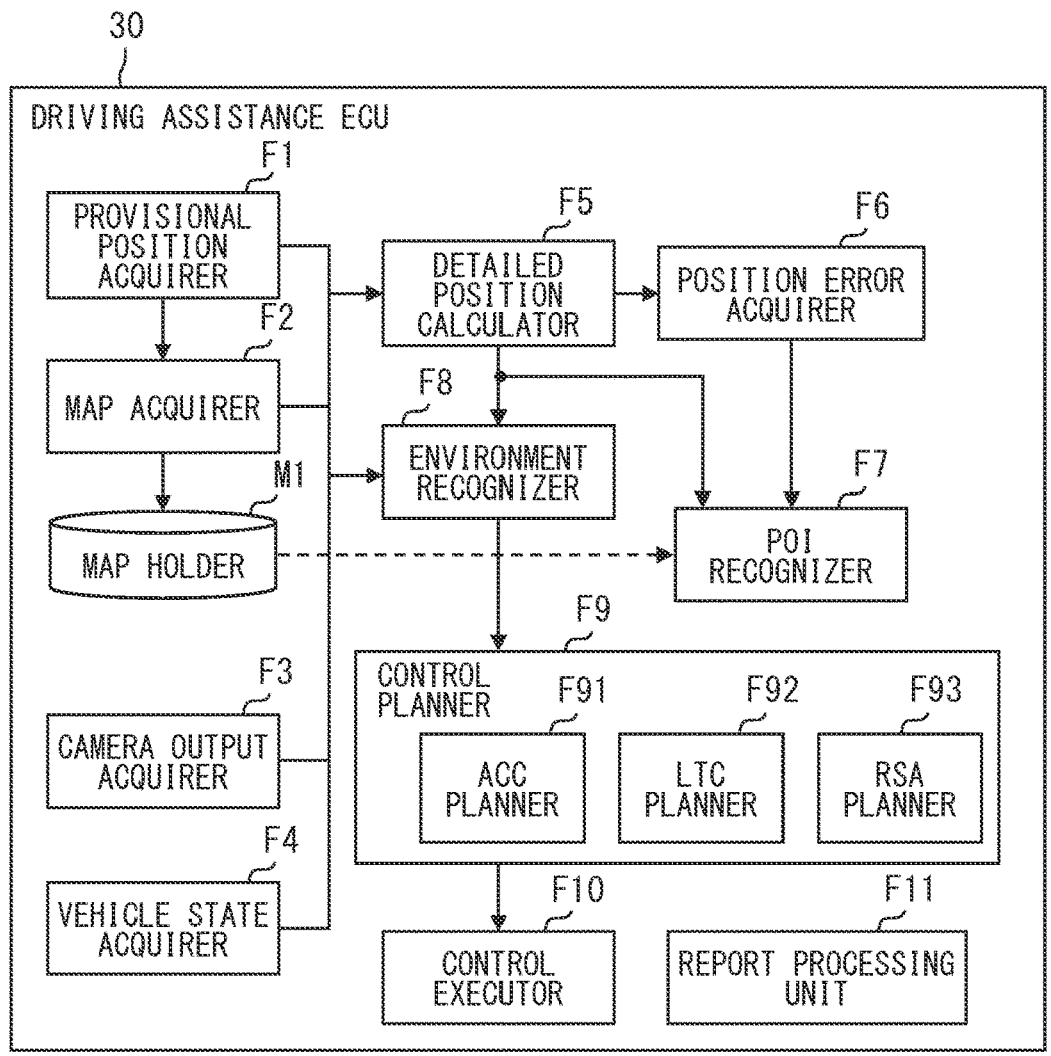
FIG. 8 is a block diagram showing a configuration of a driving assistance ECU.

Here, the function and operation of the driving assistance ECU 30 will be described with reference to FIG. 8. The driving assistance ECU 30 provides functions corresponding to various functional blocks shown in FIG. 8 by executing the driving assistance program stored in the storage 33. That is, the driving assistance ECU 30 includes, as functional blocks, a provisional position acquirer F1, a map acquirer F2, a camera output acquirer F3, a vehicle state acquire rF4, a detailed position calculator F5, a position error acquirer F6, and a POI recognizer F7. In addition, the driving assistance ECU 30 includes an environment recognizer F8, a control planner F9, a control executor F10, and a report processing unit F11.

The provisional position acquirer F1 acquires position information of the host vehicle from the locator 23. In addition, the provisional position acquirer F1 performs dead reckoning on the basis of an output of a yaw rate sensor or the like with a position calculated by the detailed position calculator F5 to be described later as a starting point. Note that the provisional position acquirer F1 may have the function of the locator 23.

The map acquirer F2 wirelessly communicates with the map server 1 via the V2X in-vehicle device 24 to acquire map data corresponding to the current position of the host vehicle. For example, the map acquirer F2 requests the map server 1 to acquire map data regarding a road through which the host vehicle is scheduled to pass within a predetermined time. Note that, as described above, the map data acquired here is mainly the POI data set and the landmark data. Acquisition of the network data can be omitted. The map data acquired from the map server 1 is stored in, for example, a map holder M1. The map holder M1 is implemented by using, for example, a part of a storage region included in the storage 33 or the RAM 32. The map holder M1 is implemented by using a non-transitory tangible storage medium.

As the current position used at a time of acquiring a map, the current position specified by the provisional position acquirer F1 or the detailed position calculator F5 can be adopted. For example, when the detailed position calculator F5 has been able to calculate the current position, the map data is acquired by using the position information. On the other hand, when the detailed position calculator F5 has not been able to calculate the current position, the map data is acquired by using position coordinates acquired by the provisional position acquirer F1. The provisional position acquirer F1 and the detailed position calculator F5 are equivalent to a vehicle position acquirer.

Note that the in-vehicle system 2 may include an in-vehicle storage device that stores network data. In this case, the map acquirer F2 can be configured to sequentially read network data around the current position from the in-vehicle storage device. For example, the map acquirer F2 may be configured to read the network data from the in-vehicle storage device and download the POI data from the map server 1 as needed.

The camera output acquirer F3 acquires a recognition result of the front camera 21 as for other mobile bodies, landmarks, and the like. For example, the camera output acquirer F3 acquires a position, a moving speed, a category, a size, and the like of the other mobile bodies. The other mobile bodies include an automobile as another vehicle, a pedestrian, a bicycle, and the like. Furthermore, the camera output acquirer F3 acquires a relative position, a category, and the like of the landmark from the front camera 21.

Note that the camera output acquirer F3 converts relative position coordinates of the landmark acquired from the camera ECU 212 into position coordinates (hereinafter, also described as observation coordinates) in a global coordinate system. The observation coordinates of the landmark are calculated, for example, by combining the current position coordinates of the host vehicle and the relative position information of the feature with respect to the host vehicle. Note that the camera ECU 212 may calculate the observation coordinates of the landmark by using the current position coordinates of the host vehicle. The data acquired by the camera output acquirer F3 is provided to the environment recognizer F8.

The vehicle state acquirer F4 acquires the traveling speed, the traveling direction, time information, weather, illuminance outside the vehicle compartment, an operation speed of a wiper, and the like from the vehicle state sensor 22 and the like via the in-vehicle network Nw.

The detailed position calculator F5 executes localization processing based on the landmark information and track information acquired by the camera output acquirer F3. The localization processing refers to processing of identifying a detailed position of the host vehicle by collating a position of a landmark or the like identified on the basis of an image captured by the front camera 21 with position coordinates of a feature registered in the map data. The localization processing may include at least one of longitudinal position estimation processing or lateral position estimation processing. The longitudinal position estimation processing is processing of estimating a position in a longitudinal direction by using a landmark such as an area signboard, for example. The lateral position estimation processing is processing of estimating a position in a lateral direction of a road by using observation coordinates of a lane division line, a road edge, or the like. The longitudinal direction here corresponds to the front-rear direction of the vehicle. In addition, the longitudinal direction corresponds to the road extending direction which is a direction in which a road extends when viewed from the host vehicle in a straight road section. The lateral direction here corresponds to the width direction of the road.

As the longitudinal position estimation processing, the detailed position calculator F5 associates the landmark registered on the map with the landmark observed by the front camera 21 on the basis of the observation coordinates of the landmark. For example, among landmarks registered on the map, a landmark closest to the observation coordinates of the landmark is estimated as the same landmark. Note that, in collation of landmarks, it is preferable to use a feature quantity such as a shape, a size, or a color, for example, and to adopt a landmark having a higher level of matching of features. When the association between the observed landmark and the landmark on the map ends, a position shifted in the longitudinal direction by a distance between the observation landmark and the host vehicle from the position of the landmark on the map corresponding to the observed landmark is set as a longitudinal position of the host vehicle on the map.

For example, in a situation where a distance to the area signboard existing right in front of the host vehicle is specified as 40 m as a result of the image recognition, it is determined that the host vehicle exists at a position shifted backward by 40 m from the position coordinates of the area signboard registered in the map data. The longitudinal position estimation is equivalent to processing of specifying a host vehicle position in the road extending direction. The longitudinal position estimation can also be referred to as localization processing in the longitudinal direction. By performing such longitudinal position estimation, a feature point on the road, in other words, a detailed remaining distance to the POI, such as an intersection, a curve entrance and exit, a tunnel entrance and exit, and an end of traffic congestion, is specified.

When a plurality of landmarks (for example, an area signboard) is detected ahead of the host vehicle, the detailed position calculator F5 performs the longitudinal position estimation by using the landmark closest to the host vehicle among the plurality of landmarks. The closer the object is to the host vehicle, the higher the recognition accuracy of the category and distance of the object based on an image or the like is. That is, in a case where a plurality of landmarks is detected, by performing the longitudinal position estimation by using the landmark closest to the vehicle, the position estimation accuracy can be improved.

In addition, as a more preferable mode, the detailed position calculator F5 according to the present embodiment is configured to execute the longitudinal position estimation processing by using, for example, landmarks existing within a predetermined effective distance in order to ensure the position calculation accuracy. The effective distance can be, for example, 40 m. The effective distance may be 30 m or 50 m. Furthermore, in a case where the front camera 21 includes a telephoto camera, the effective distance may be 100 m or the like. The effective distance may be set on the basis of performance and specifications such as a recognizable distance and an angle of view of the front camera 21.

As the lateral position estimation processing, the detailed position calculator F5 specifies the lateral position of the host vehicle with respect to the road on the basis of distances from left and right road edges and division lines recognized by the front camera 21. For example, when the distance from the left road edge to the center of the vehicle is specified as 1.75 m as a result of an image analysis, it is determined that the host vehicle exists at a position shifted 1.75 m to the right from the coordinates of the left road edge. The lateral position estimation can also be referred to as localization processing in the lateral direction. The detailed position calculator F5 may specify a traveling lane ID which is an identifier of the lane on which the host vehicle is traveling on the basis of distances from left and right road edges and division lines recognized by the front camera 21. The traveling lane ID indicates, for example, the number of lanes from the left or right road edge on which the host vehicle is traveling. The detailed position calculator F5 may specify the detailed position of the host vehicle in the traveling lane, for example, an offset amount in the left-right direction from the center of the lane on the basis of the distance from the left and right division lines recognized by the front camera 21.

The host vehicle position as a result of the localization processing may be expressed by a coordinate system similar to the map data, for example, latitude, longitude, and altitude. Host vehicle position information can be expressed by any absolute coordinate system such as world geodetic system 1984 (WGS84).

The detailed position calculator F5 sequentially performs the localization processing in a predetermined position estimation cycle. A default value of the position estimation cycle may be 200 milliseconds or 400 milliseconds. For example, as long as the landmark can be recognized (in other words, captured), the detailed position calculator F5 sequentially performs the longitudinal position estimation processing in the above position estimation cycle. Even in a case where a landmark for longitudinal position estimation, such as an area signboard, cannot be recognized, the detailed position calculator F5 sequentially executes the lateral position estimation processing in the position estimation cycle as long as at least one of the division line or the road edge can be recognized (in other words, captured). The host vehicle position information calculated by the detailed position calculator F5 is output to the provisional position acquirer F1, the position error acquirer F6, the environment recognizer F8, and the like.

Every time the detailed position calculator F5 executes the localization processing, the position error acquirer F6 calculates a vehicle position error which is a difference between a current position output as a result of the localization processing performed that time and a position calculated by the provisional position acquirer F1 by dead reckoning or the like. As long as the localization processing can be sequentially performed, the result of the localization processing at a previous time is reflected in provisional position information calculated by the provisional position acquirer F1. Therefore, the vehicle position error has a sufficiently small value. For example, as long as the localization processing can be sequentially performed, the vehicle position error can be expected to be suppressed to less than 0.5 m.

The longer a period in which localization cannot be performed is, the greater the vehicle position error tends to be. In the period in which the localization processing cannot be executed, the position error acquirer F6 calculates a provisional vehicle position error by multiplying a predetermined error estimation coefficient by an elapsed time or a travel distance from a time point at which the localization processing can be executed last. The vehicle position error calculated by the position error acquirer F6 is output to the POI recognizer F7 and the environment recognizer F8.

In addition, the position error acquirer F6 may evaluate the positioning accuracy of the GNSS receiver. The positioning accuracy can be evaluated on the basis of, for example, variations in positioning results of the GNSS receiver, the number of captured satellites, an SN ratio, an elevation angle, and the like. The positioning accuracy may be evaluated on the basis of whether a current travel environment is equivalent to an urban area, a rural area, or a mountain area. Since the urban area is equivalent to a so-called multipath environment in which multipath is likely to occur, the positioning accuracy tends to be relatively low. Since the rural area is equivalent to a so-called open sky environment in which there is no shielding object such as a high-rise building, the positioning accuracy becomes relatively high. In the mountainous area, the accuracy is lower than the open sky environment. The evaluation result of the positioning accuracy can be referred to by the POI recognizer F7, for example.

The POI recognizer F7 recognizes the position of the POI existing ahead of the host vehicle on the basis of the POI data set acquired by the map acquirer F2 and held in the map holder M1. The recognition result is output to the environment recognizer F8 and the control planner F9. Details of the POI recognizer F7 will be separately described later.

The environment recognizer F8 recognizes a surrounding environment which is an environment around the host vehicle on the basis of the recognition result or the like by the front camera 21 acquired by the camera output acquirer F3. Here, the surrounding environment includes the current position of the host vehicle, and relative positions of a traveling lane, a road category, a speed limit, a traffic light, and the like. In addition, the surrounding environment can include a position and a moving speed of another mobile body, a shape and a size of a surrounding object, and the like.

Note that the environment recognizer F8 may recognize the position and category of the object existing around the host vehicle by acquiring detection results from each of a plurality of surrounding monitoring sensors and combining the detection results. In addition, the environment recognizer F8 may specify the surrounding environment by using other vehicle information received by the V2X in-vehicle device 24 from other vehicles, traffic information received from a roadside device by road-to-vehicle communication, and the like. The traffic information that can be acquired from the roadside device can include road construction information, traffic regulation information, traffic congestion information, weather information, speed limit, and the like. Furthermore, the environment recognizer F8 may recognize the environment ahead the host vehicle on the basis of the recognition result of the POI by the POI recognizer F7.

The control planner F9 uses the travel environment recognized by the environment recognizer F8 and the recognition result of the POI recognizer F7 to create a vehicle control plan for assisting the driving operation of the user. The control planner F9 includes, as functional units, an ACC planner F91, an LTC planner F92, and an RSA planner F93. The ACC planner F91 is a functional unit that creates a control plan for executing an adaptive cruise control (ACC) function that automatically adjusts a traveling speed on the basis of a traffic situation ahead of the vehicle. ACC refers to, for example, control that causes the vehicle to travel at a constant speed at a target vehicle speed on the basis of the traffic situation ahead of the vehicle, or causes the vehicle to travel following a preceding vehicle while maintaining an inter-vehicle distance from the preceding vehicle. The LTC planner F92 is a functional unit that creates a control plan for implementing a lane tracing assist (LTA) function that executes steering control along a traveling lane on the basis of lane information. The LTC planner F92 creates a route along a recognized motion or travel trajectory of the preceding vehicle as a traveling plan. The LTC is also referred to as lane tracing assist (LTA). The RSA planner F93 is a functional unit that creates a control plan for implementing a road sign assist (RSA) function of displaying an image of a traffic sign or the like recognized by the front camera 21 on the display 251.

In addition, in a case where a traveling road of the host vehicle corresponds to a road having a plurality of lanes on one side, the control planner F9 can create a control plan for changing the lane to the adjacent lane in the same direction as the traveling lane of the host vehicle. When it is confirmed that there is an obstacle ahead of the host vehicle on the basis of the detection result of the front camera 21 or the map data, the control planner F9 can create a traveling plan for passing through a side of the obstacle. The traveling plan may include acceleration and deceleration schedule information for speed adjustment on the calculated route. The control planner F9 may create a plan for causing the vehicle to autonomously travel, that is, a plan for automated driving.

In a case where the POI recognizer F7 has detected that there is a POI on a course of the host vehicle, the control planner F9 creates a control plan in accordance with the category of the POI. The control plan according to the category of the POI is created on the basis of at least one of the category, the action content, or the supplementary information indicated in a POI-related data set. As a result, vehicle control according to the category or the like of the POI existing ahead of the host vehicle is executed.

The control executor F10 is configured to output a control signal corresponding to the control plan determined by the control planner F9 to the travel actuator 26 and/or the HCU 252 to be controlled. For example, in a case where deceleration is scheduled, a control signal for implementing a planned deceleration with respect to the brake actuator or the electronic throttle is output. In addition, a control signal for outputting an image or sound according to the category of the POI is output to the HCU 252.

The report processing unit F11 is configured to generate probe data, which is data for the map server 1 to generate and update the original map data, on the basis of the detection result of the surrounding monitoring sensor including the front camera 21, and upload the probe data to the map server 1 via the V2X in-vehicle device 24. For example, the report processing unit F11 transmits a data set indicating an observed position of a feature specified by the front camera 21 to the map server 1 as probe data. The probe data is equivalent to data obtained by packaging a recognition result within a certain time (for example, 400 milliseconds) as for a landmark or the like. The probe data may include, for example, transmission source information, travel trajectory information, and feature information. The travel trajectory data is information indicating a trajectory on which the host vehicle has traveled. In addition, the probe data may include vehicle motion information such as a vehicle speed, a steering angle, a yaw rate, blinker operation information, and wiper operation information. The probe data may include a vehicle position error and information related to the positioning accuracy such as the open sky environment or the multipath environment.

<POI Recognizer F7>

Figure 9:
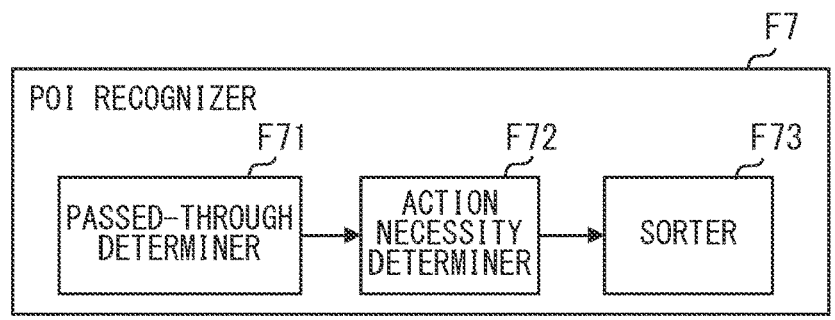
FIG. 9 is a functional block diagram of a POI recognizer.

Here, the function and operation of the POI recognizer F7 will be described with reference to FIG. 9. The POI recognizer F7 includes, as functional units, a passed-through determiner F71, an action necessity determiner F72, and a sorter F73.

The passed-through determiner F71 is configured to determine whether the host vehicle has passed through the notice area An stored in the map holder M1 on the basis of the position information of the host vehicle output from the detailed position calculator F5 or the provisional position acquirer F1. The passed-through determiner F71 sequentially determines a positional relationship between the notice area An indicated in each POI data set and the host vehicle, and determines whether the host vehicle has entered any notice area An. The passed-through determiner F71 also sequentially determines whether the host vehicle has exited from the notice area An where the host vehicle has entered. When determining that the host vehicle has entered into the notice area An, the passed-through determiner F71 stores the position of the host vehicle at that time as an entry position Pi. When determining that the host vehicle has exited from the notice area An, the passed-through determiner F71 stores the position of the host vehicle at that time as an exit position Po.

For example, when determining that the vehicle has passed through a certain notice area An, the passed-through determiner F71 sets a passed-through flag for the notice area An and sets a POI corresponding to the notice area An as a verification target POI. Then, the POI-related data of the verification target POI, such as the category of the verification target POI, the validity condition, the action content, and the supplementary information, is output to the action necessity determiner F72.

In addition, the passed-through determiner F71 outputs a value obtained by subtracting a half of a distance from the entry position Pi to the exit position Po from the initial remaining distance Dcn to the action necessity determiner F72 as an exit-time remaining distance. The exit-time remaining distance refers to a remaining distance to the verification target POI at a time of exiting the notice area An. When the area radius Rn is sufficiently smaller than the initial remaining distance Dcn, the initial remaining distance Dcn may be output as it is to the action necessity determiner as the exit-time remaining distance. The area radius Rn being sufficiently smaller than the initial remaining distance Dcn refers to, for example, the area radius Rn being 1/50 or less of the initial remaining distance Dcn. The above-described position determination and arithmetic processing by the passed-through determiner F71 is performed for each notice area An, in other words, for each POI data set.

The action necessity determiner F72 compares the validity condition of the verification target POI with a traveling state of the host vehicle acquired by the vehicle state acquirer F4 to determine whether the verification target POI is a POI that affects the travel control of the host vehicle. In other words, the POI that affects the travel control of the host vehicle is equivalent to a POI that is on the traveling lane of the host vehicle and on which the vehicle control according to the category of the POI is to be executed. The POI that affects the travel control of the host vehicle can also be referred to as a POI that is valid for the host vehicle. The POI that does not affect the travel control of the host vehicle is equivalent to a POI that is invalid for, in other words, unrelated to the host vehicle. For example, a POI of another road, a POI of an opposite lane, and the like are equivalent to invalid POIs for the host vehicle.

Figure 10:
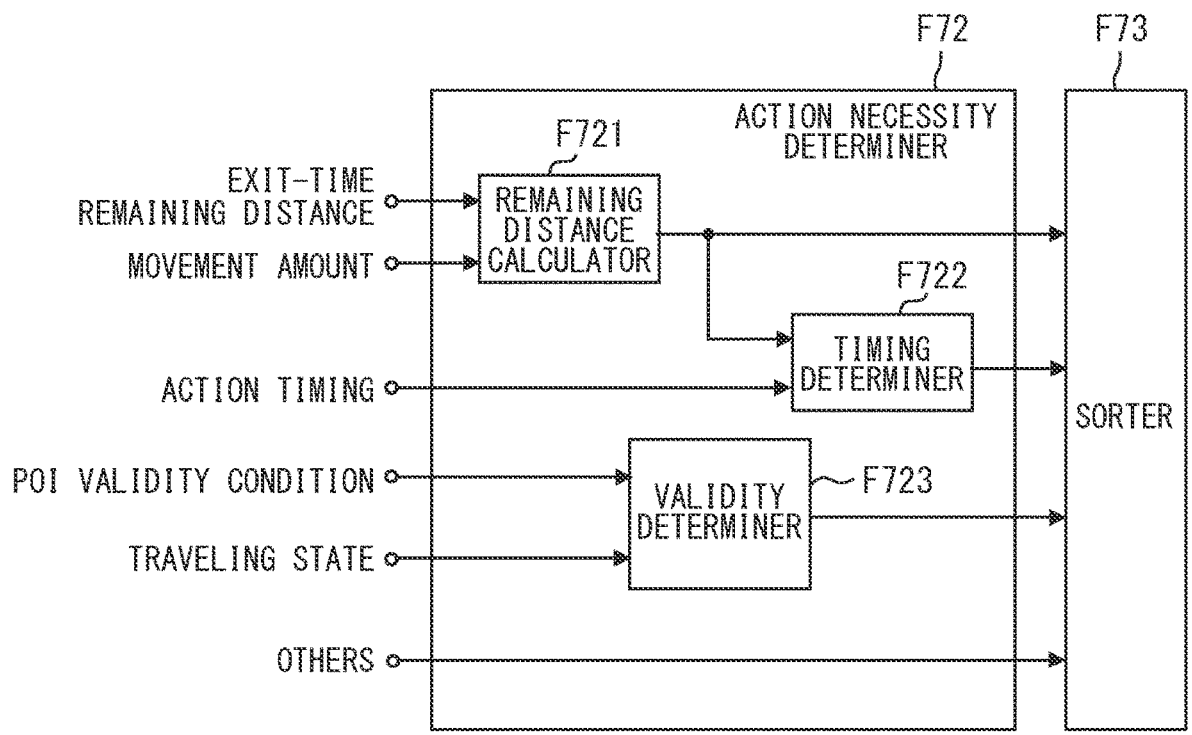
FIG. 10 is a functional block diagram of an action necessity determiner.

FIG. 10 is a block diagram conceptually showing an operation of the action necessity determiner F72 and a flow of input and output signals. The action necessity determiner F72 includes, as functional units, a remaining distance calculator F721, a timing determiner F722, and a validity determiner F723. The remaining distance calculator F721 sequentially calculates the remaining distance to the POI on the basis of the remaining distance input from the passed-through determiner F71 and a movement amount of the host vehicle from a time of exit from the notice area, and outputs the remaining distance to the sorter F73. The movement amount of the host vehicle is only required to be calculated, for example, by time-integrating the vehicle speed at each time. Alternatively, a length of a regression curve obtained by connecting the position coordinates at each time calculated by the detailed position calculator F5 may be adopted as the movement amount of the host vehicle.

The timing determiner F722 determines whether an action timing indicated in the POI data set of the verification target POI has come. When the remaining distance calculated by the remaining distance calculator F721 becomes less than a distance set as the action timing, it is output to the sorter F73 that the timing to respond has come. For example, when the remaining distance is less than a set value of the action timing, the timing determiner F722 sets a timing flag to ON and outputs the timing flag. On the other hand, in a case where the remaining distance is equal to or greater than the set value of the action timing, the timing determiner F722 outputs the timing flag set to OFF. The timing flag is a flag for managing whether the action timing has come.

The validity determiner F723 is configured to determine whether the traveling state or the like of the host vehicle satisfies the validity condition of the verification target POI. For example, it is determined whether the traveling direction, the vehicle speed, the traveling lane, and the like of the host vehicle satisfy the traveling direction, the vehicle speed, the lane ID, and the like set as the validity conditions.

For example, the validity determiner F723 determines whether a moving direction of the host vehicle matches the traveling direction set as the validity condition. When the moving direction of the vehicle matches the traveling direction defined as the validity condition, the match is not limited to a perfect match. The match includes a case where an angle formed by the traveling direction defined as the validity condition and the moving direction of the vehicle is, for example, less than 30°. Note that the traveling direction defined as the validity condition may be set so as to have a predetermined angular range such as ±30° in due east.

In addition, the validity determiner F723 determines whether the traveling speed of the host vehicle falls within a speed range set as the validity condition. Furthermore, the validity determiner F723 determines whether the traveling lane of the host vehicle matches the traveling lane set as the validity condition. In addition, in a case where a vehicle category (so-called vehicle model) is set as the validity condition, the validity determiner F723 determines whether the vehicle model of the host vehicle matches the vehicle model set as the validity condition. The vehicle model of the host vehicle may be specified by referring to, for example, data registered in advance in the storage 33.

Note that the moving direction of the host vehicle can be expressed by, for example, an azimuth angle. The moving direction may be expressed by an angle with respect to a predetermined reference direction such as due east or due north. The validity determiner F723 may acquire azimuth angle information indicating the direction of a vehicle body as the moving direction from an in-vehicle sensor and determine whether the moving direction matches the traveling direction set as the validity condition. Note that the moving direction of the vehicle may be specified by using an area passing-through vector which is a vector from the entry position Pi to the exit position Po.

Figure 11:
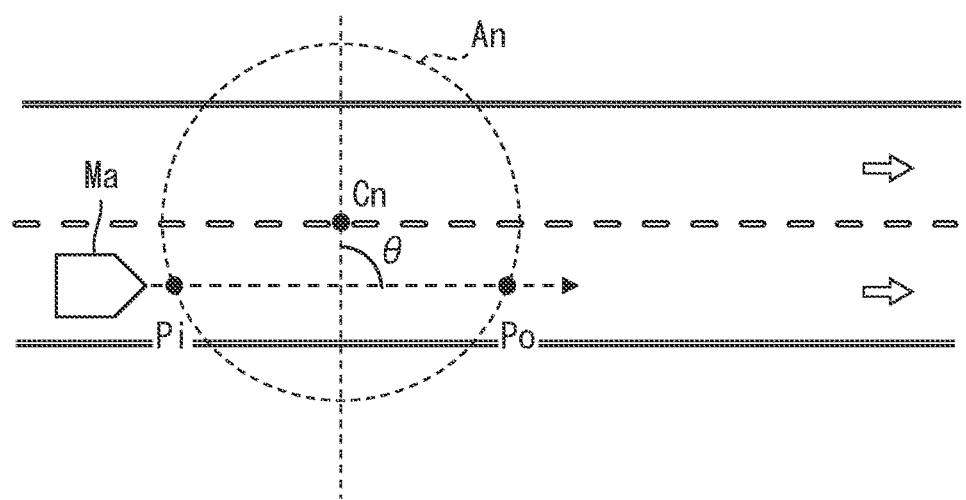
FIG. 11 is a diagram for describing an area passing-through vector.

In addition, the validity condition related to the traveling direction may be defined by an angle of the traveling direction with respect to the road width direction. In such a case, as shown in FIG. 11, the validity determiner F723 calculates an area passing-through angle $\theta$ which is an angle formed by a vector from the entry position Pi toward the exit position Po with respect to the road width direction. Then, it is determined whether the area passing-through angle falls within the angle range set as the validity condition. For example, in a case where the angle of the traveling direction with respect to the road width direction is set within 45° to 135° as the validity condition, it is determined that the condition of the traveling direction is satisfied when the area passing-through angle $\theta$ falls within the angular range. Note that the area passing-through angle can also be interpreted as an inclination with respect to the road width direction. The area passing-through angle $\theta$ and the angle defined in the validity condition may be set and calculated on the basis of the road extending direction instead of the road width direction. A reference direction for calculating the area passing-through angle $\theta$ may be included in the POI-related data.

When determining that the validity condition is satisfied, the validity determiner F723 outputs a signal indicating that the verification target POI is a POI valid for the host vehicle to the sorter F73. For example, when the traveling state of the host vehicle satisfies the validity condition, the validity determiner F723 sets a validity flag to ON and outputs the validity flag. On the other hand, when the traveling state of the host vehicle does not satisfy the validity condition, the validity determiner F723 sets the validity flag to OFF and outputs the validity flag. Note the state of the host vehicle satisfying the validity condition means that the verification target POI requires an action for the host vehicle.

In addition, the action necessity determiner F72 transfers and outputs, to the sorter F73, the category of the verification target POI, the action content, the supplementary information, and the like input from the passed-through determiner F71. In a case where there is a plurality of notice areas An through which the host vehicle has passed, the processing of the action necessity determiner F72 described above is executed, for example, in parallel for each POI corresponding to each notice area An.

The sorter F73 is configured to absorb actions against a plurality of POIs having different time series, in other words, different remaining distances to the POI and different action timings. For example, among the plurality of POIs, the POI-related data whose POI has a closer action start timing is preferentially output to the control planner F9. The sorter F73 outputs the POI-related data to the control planner F9 in order of the action start timing.

<Operation Flow of Driving Assistance ECU 30>

Figure 12:
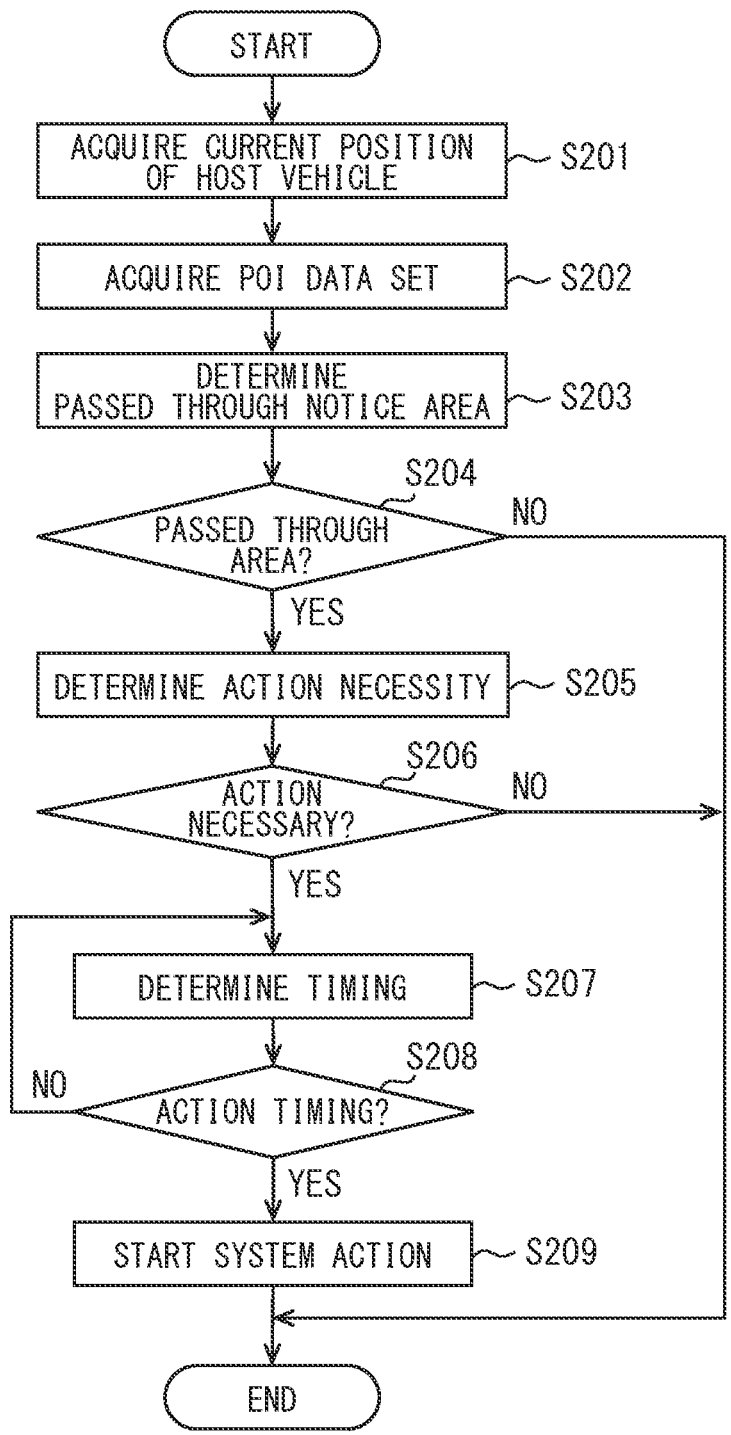
FIG. 12 is a flowchart of POI action processing performed by the driving assistance ECU.

Next, POI action processing executed by the driving assistance ECU 30 will be described with reference to a flowchart shown in FIG. 12. The flowchart shown in FIG. 12 can be executed for each notice area indicated by the POI data set stored in the map holder M1. For convenience, the notice area An to be processed is also referred to as a target notice area. The POI action processing according to the present embodiment includes steps S201 to S209 as an example. This flow can be executed, for example, for the notice area An in which the passed-through flag is not set to ON. Note that the number of steps, a processing order, and the like included in the POI action processing can be changed as appropriate.

First, in step S201, the POI recognizer F7 acquires the current position of the host vehicle from the detailed position calculator F5, and the process proceeds to step S202. Note that, in a case where the detailed position calculator F5 has not been able to execute the localization processing due to the absence of a landmark or the like, the position information may be acquired from the provisional position acquirer F1. Step S201 can be referred to as a vehicle position acquisition step.

In step S202, the map acquirer F2 acquires map data of an area corresponding to the current position or the like acquired in step S201 from the map server 1, and the processing proceeds to step S203. In a case where the map data of the area corresponding to the current position has been acquired, step S202 can be omitted. In addition, the processing of acquiring the map data may be performed independently of, in other words, in parallel to the POI action processing. Step S202 can be referred to as a map acquisition step.

In step S203, the passed-through determiner F71 compares the position information of the target notice area with the current position of the host vehicle, and determines whether the host vehicle has entered the target notice area. In a case where the host vehicle is located in the target notice area, the entry position Pi is specified, and a positional relationship between the target notice area and the host vehicle is sequentially compared thereafter to specify the exit position Po. The POI-related data and the exit-time remaining distance corresponding to the target notice area are output to the action necessity determiner F72. When the host vehicle has passed through the target notice area, an affirmative determination is made in step S204, and the processing proceeds to step S205. On the other hand, when the host vehicle has not yet entered the target notice area, a negative determination is made in step S204, and this flow ends. In that case, this flow for the same notice area An is executed again from step S201 after a predetermined time such as 200 milliseconds. Step S203 can be referred to as a passed-through determination step.

In step S205, the action necessity determiner F72 determines whether the POI is a POI valid for the host vehicle on the basis of the POI-related data to be processed. When it is determined that the POI to be processed is a POI valid for the host vehicle as a result of the determination, step S206 is affirmed, and the processing proceeds to step S207. On the other hand, when it is determined that the POI to be processed is not a POI valid for the host vehicle, a negative determination is made in step S206, and this flow ends. Step S205 can be referred to as a validity determination step.

Meanwhile, as a motion of the vehicle, a case where the vehicle passes through the notice area An and then changes the lane to the lane where the POI exists is also assumed. That is, even when the validity condition of the POI is not satisfied from the viewpoint of the traveling lane immediately after passing through the notice area An, the validity condition can be satisfied by the subsequent lane change. Considering the above case, the processing of determining the validity or invalidity of the POI based on the traveling lane is preferably sequentially executed for the POI corresponding to the notice area An in which the passed-through flag is set to ON until the remaining distance to the POI becomes 0 or less than a predetermined value.

In step S207, the timing determiner F722 determines whether the remaining distance to the POI is less than the distance set as the action timing. In a case where the remaining distance to the POI is less than the distance set as the action timing, an affirmative determination is made in step S208, and the processing proceeds to step S209. On the other hand, in a case where the remaining distance to the POI is equal to or greater than the distance set as the action timing, a negative determination is made in step S208, and the processing returns to step S207. As a result, the remaining distance and the set value of the action timing are periodically compared. Step S207 can be referred to as an action timing determination step.

In step S209, a system action according to the category of the POI is started. The content of the system action may be a recommended action content set in the related data, or may be determined by the control planner F9 in accordance with the POI category or the like. Step S209 can be referred to as an action processing step.

The POI recognizer F7 described above recognizes the POI existing ahead depending on whether the notice area An has been passed through. On the basis of whether the validity condition distributed in association with the notice area An is satisfied, whether the POI is a POI related to the host vehicle is determined, in other words, the validity is determined. Then, when it is determined that the POI is related to the host vehicle, information regarding the POI is output to the control planner F9 and reflected in the control plan of the vehicle.

Such a configuration allows the driving assistance ECU 30 to recognize the POI existing ahead of the host vehicle even when the POI is not associated with the network data indicating the road network. That is, it is possible to predict the presence of the POI while the amount of communication of the map data is reduced. In addition, when the validity condition distributed in association with the notice area An is not satisfied, the information regarding the POI is not output to the control planner F9. It is therefore possible to reduce a possibility that the system reacts to a POI unrelated to the traveling of the host vehicle. That is, it is possible to reduce inappropriate action of the system against a POI unrelated to the host vehicle.

<Supplement to Operation Mode of Vehicle Control System 100>

Figure 13:
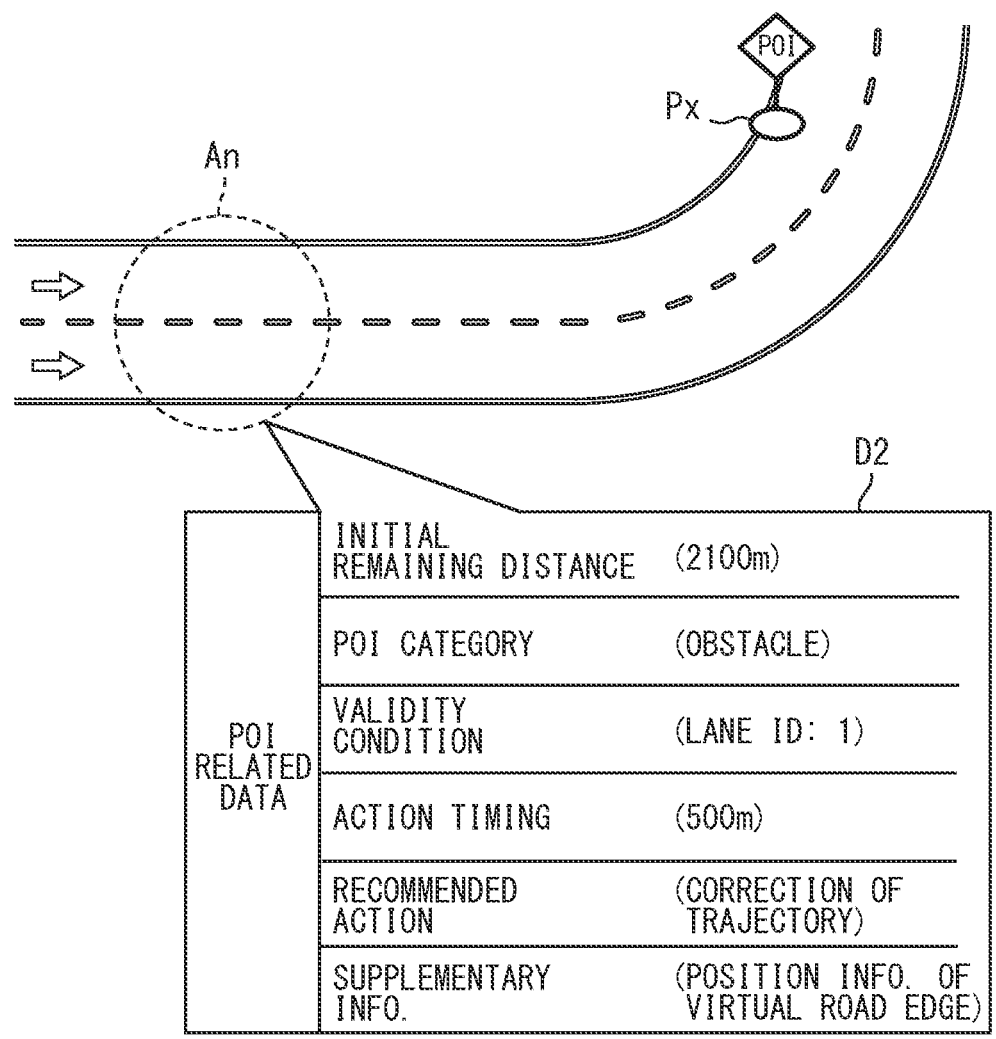
FIG. 13 is a diagram showing an example of POI-related data corresponding to an obstacle.

The map server 1 can appropriately change information included in the POI-related data such as the action content on the basis of the category of the POI and the road structure around the POI. For example, as shown in FIG. 13, the map server 1 adds position information of a virtual road edge as supplementary information to the POI-related data for an obstacle such as a falling object or a stopped vehicle. The information included in the POI-related data as the trajectory determination data for avoiding the obstacle may be a traveling trajectory model or the like.

This configuration enables calculation of a safe and smooth traveling line in advance even in a scene where detection of an obstacle by the front camera 21 can be delayed, such as a case where there is an obstacle in the middle of a curve, as shown in FIG. 13, for example. As a result, safety and ride comfort can be maintained or improved even in a scene where control is difficult, for example, in a curve section including an obstacle. In addition, since the trajectory information for avoiding obstacles is distributed from the map server 1, the processing load of the driving assistance ECU 30 can be reduced.

Figure 14:
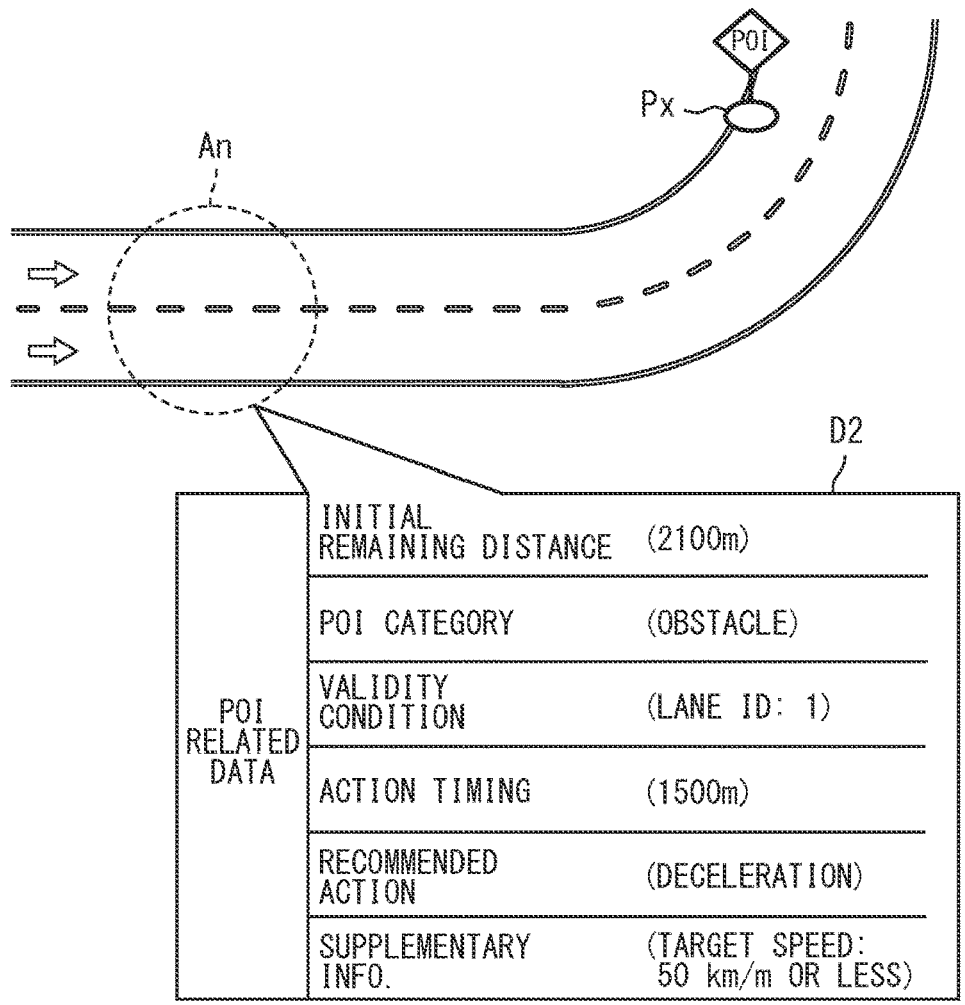
FIG. 14 is a diagram showing a setting example of a notice area in a case where an obstacle exists in the middle of a curve.

As shown in FIG. 14, when a dynamic POI such as an obstacle or an end of traffic congestion exists on a curve, the map server 1 provides a notice area for the dynamic POI backward of the start point of the curve. This configuration allows the driving assistance ECU 30 to recognize the presence of an obstacle or the like that cannot be seen ahead of the curve before entry to the curve. Note that the POI-related data for the dynamic POI existing in the middle of a curve preferably includes a target speed or the like at the time of entry to the curve. In addition, the POI-related data for the dynamic POI existing in the middle of the curve preferably includes the trajectory determination data for avoiding obstacles and traveling. That is, the POI-related data in the scene shown in FIG. 14 may include, as action contents, two action contents of correction of the traveling trajectory and deceleration, and specific target values associated therewith.

Although the scene in which the POI exists in the middle of a curve has been exemplified above, the present invention is not limited thereto, and the same applies to a case where the POI exits ahead of a curve. In addition, the same applies to the POI exiting within a predetermined distance from the exit of a tunnel without being limited to the middle of a curve or ahead of the curve. The reason is that there is a possibility that it is difficult for the front camera 21 to recognize an obstacle and the end of a traffic jam since the brightness outside the vehicle compartment rapidly changes near the exit of a tunnel.

Similarly, in a case where a POI such as a temporary stop line, a crosswalk, or a traffic light exists in the middle of a curve or ahead of the curve, the map server 1 provides a notice area for the POI backward of the start point of the curve. This configuration allows the driving assistance ECU 30 to recognize the presence of a temporary stop line or the like that cannot be seen ahead of the curve before entry to the curve. Note that the POI-related data for the POI existing in the middle of a curve or ahead of the curve preferably includes a target speed or the like at the time of entry to the curve.

Although the embodiment of the present disclosure has been described above, the present disclosure is not limited to the embodiment. Various configurations described below are also included in the technical scope of the present disclosure, and various modifications other than the following can be made without departing from the gist of the present disclosure. For example, the following various configurations can be appropriately combined and implemented as long as no technical contradiction occurs. Note that members having the same functions as those of the members described in the above embodiment are denoted by the same reference numerals, and the description thereof will be omitted. In a case where only a part of a configuration is referred to, the configuration of the embodiment described above can be applied to other parts.

Figure 15:
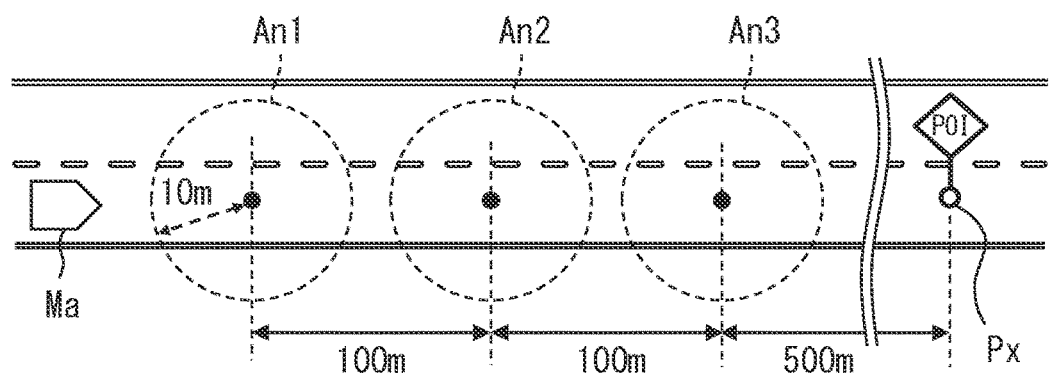
FIG. 15 is a diagram for describing a configuration example in which a plurality of notice areas is disposed for one POI.

As shown in FIG. 15, the notice area setting unit G2 may set a plurality of notice areas An for one POI. The plurality of notice areas An for the same POI are disposed at predetermined intervals along a road or a lane. An area interval Di, which is an interval between a plurality of notice areas for the same POI, can be, for example, 50 m or 100 m. The area interval Di is preferably set to a value sufficiently greater than the area radius Rn, for example, ten times the area radius Rn. The area radius Rn and the area interval shown in FIG. 15 are examples.

The number of notice areas installed for the same POI may be a constant value such as three or five, or may be variable for each POI. In a case where a plurality of notice areas is disposed for one POI, the number of notice areas installed for the target POI is preferably included in the POI-related data D2. In the example shown in FIG. 15, three notice areas An 1 to 3 are set for one POI.

In the configuration in which the plurality of notice areas is arranged for one POI, a passed-through number and a passed-through ratio of the notice areas and the like can be adopted as the validity condition. For example, when five notice areas are arranged for an arbitral one POI, the validity condition may include a condition that the host vehicle has passed through three or more of the five notice areas. The validity condition related to the passed-through number and the passed-through ratio of the notice areas may be a condition that the host vehicle has passed through all the notice areas. The passed-through number or the passed-through ratio as the validity condition can be appropriately changed.

In the configuration in which the passed-through number or the passed-through ratio of the plurality of notice areas is set as the validity condition as described above, the POI recognizer F7 specifies the passed-through number or the like of the notice area. For example, the passed-through determiner F71 stores a result of detection of entry to and exit from the notice area in the RAM 32 or the like as passed-through history data, and the action necessity determiner F72 determines whether the validity condition regarding the passed-through number or the like is satisfied on the basis of the passed-through history data. Note that the passed-through history data does not necessarily include a history of both entry and exit. The passed-through history data may be data indicating a history of only one of entry or exit.

As described above, in the configuration in which the plurality of notice areas is set for one POI and the validity for the vehicle is determined on the basis of the passed-through number of the plurality of notice areas and the like, it is possible to further reduce inappropriate action against POIs unrelated to the host vehicle. In a case where a plurality of notice areas is set for one POI, the number of installed areas can be changed for each POI in accordance with the road structure and environment located backward of the POI, the category of the POI, the area radius, and the like. In addition, in a case where a plurality of notice areas is disposed for one POI, the traveling direction as the validity condition for each notice area can be made different in accordance with the installation position of the notice area.

The size (for example, the area radius Rn) of each notice area An can be changed in accordance with an expected value of the position estimation accuracy of the vehicle near the area center Cn. For example, in a case where an area around the area center Cn is an area with good position accuracy, the area radius Rn can be set to be smaller than in a case where the area around the area center Cn is not an area with good position accuracy. The area with position accuracy is conceptually an area in which a certain level of position estimation accuracy is secured, and refers to, for example, an area having a geographical factor in which the position estimation accuracy can be expected to be a predetermined value or more. In other words, the area with good position accuracy corresponds to an environment in which a position estimation error can be suppressed to less than a predetermined value. The area with good position accuracy can be, for example, an area in which a plurality of landmarks for performing the localization processing exists within 50 m. In addition, the area with good position accuracy can be an open sky environment.

For example, in a case where a landmark exists around the area center Cn, the notice area setting unit G2 can set the area radius Rn to be smaller than in a case where no landmark exists within a predetermined distance from the area center Cn. The reason is that, in a case where a landmark exists, the vehicle can execute the localization processing, and it can be expected that the host vehicle position can be estimated with high accuracy. In addition, by setting the area radius Rn to be small, it is possible to reduce a possibility that the vehicle not affected by the POI will erroneously react. On the other hand, in a case where no landmark exists within a predetermined distance from the area center Cn, the localization processing cannot be executed, and the position estimation accuracy can be deteriorated. If the notice area is made too small in an environment where the position estimation accuracy is deteriorated, it becomes difficult to detect that the vehicle has passed through the notice area. In view of such circumstances, by setting the area radius Rn to be large, it is possible to increase the probability that the passed-through determiner F71 can recognize that the vehicle has passed through the notice area. For a similar reason, in a case where the area around the area center Cn is in a multipath environment, the area radius Rn can be set greater than in a case where the area center Cn is in an open sky environment.

The number of notice areas installed for one POI can be changed in accordance with the expected value of the position estimation accuracy of the vehicle near the area center Cn. That is, in a case where the area around the area center Cn is the area with good position accuracy, the number of installed notice areas can be set to be smaller than in a case where the area around the area center Cn is not the area with good position accuracy. By reducing the number of areas installed, the size of the map data can be reduced, and the processing load related to area passed-through determination can be reduced.

Figure 16:
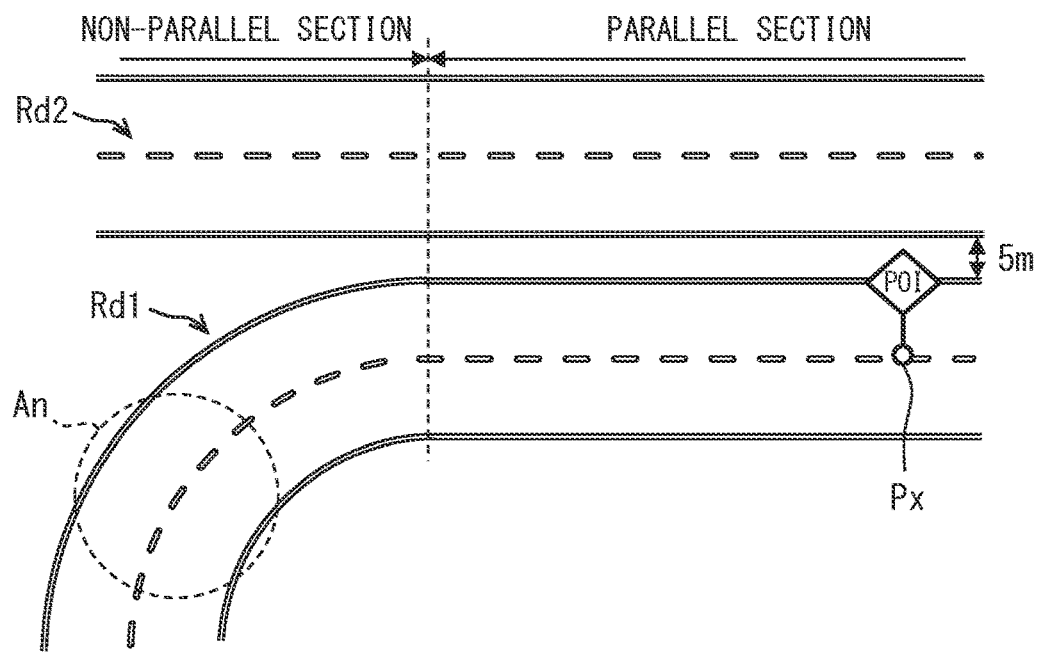
FIG. 16 is a diagram for describing a preferred installation position of a notice area in a case where another road is provided around a point where a POI exists.

In addition, as described above, the notice area setting unit G2 can appropriately adjust the installation position of the POI based on the road structure around the POI. As an example of the road structure shown in FIG. 16, there is a case where the POI exists on a road Rd1, and another road Rd2 extends along the road Rd1. The other road Rd2 is separated from the road Rd1 in a road width direction or a height direction of the road Rd1. In such a case, the notice area setting unit G2 avoids a parallel section in which an extending direction of the road Rd2 and an extending direction of the road Rd1 are parallel, and arranges the notice area An in a non-parallel section in which an angle formed by the extending direction of the road Rd2 and the extending direction of the road Rd1 is equal to or greater than a predetermined angle threshold value. The angle threshold value can be, for example, 30°, 45°, or the like.

On the basis of such an arrangement rule, the target vehicle can be limited from the viewpoint of the traveling direction in an environment where two roads are parallel, such as a junction. Specifically, it is possible to reduce a possibility that the vehicle traveling on the road Rd2 reacts to the POI on the road Rd1. Note that the term "parallel" as used herein is not limited to a completely parallel state as described in the beginning, and can include, for example, a state in which the angle formed with each other is, for example, 5°, 10°, or the like. Here, the parallel section refers to a section in which two roads in the same traveling direction are adjacent in the road width direction or the height direction. The parallel section may be limited to, for example, a section in which a distance between the roads in the road width direction or the height direction is 15 m or less. The notice area setting unit G2 described above can also be understood as a configuration in which, in one aspect, no notice area is provided in a section where two roads are adjacent to each other. The road Rd1 is equivalent to a first road, and the road Rd2 is equivalent to a second road.

Figure 17:
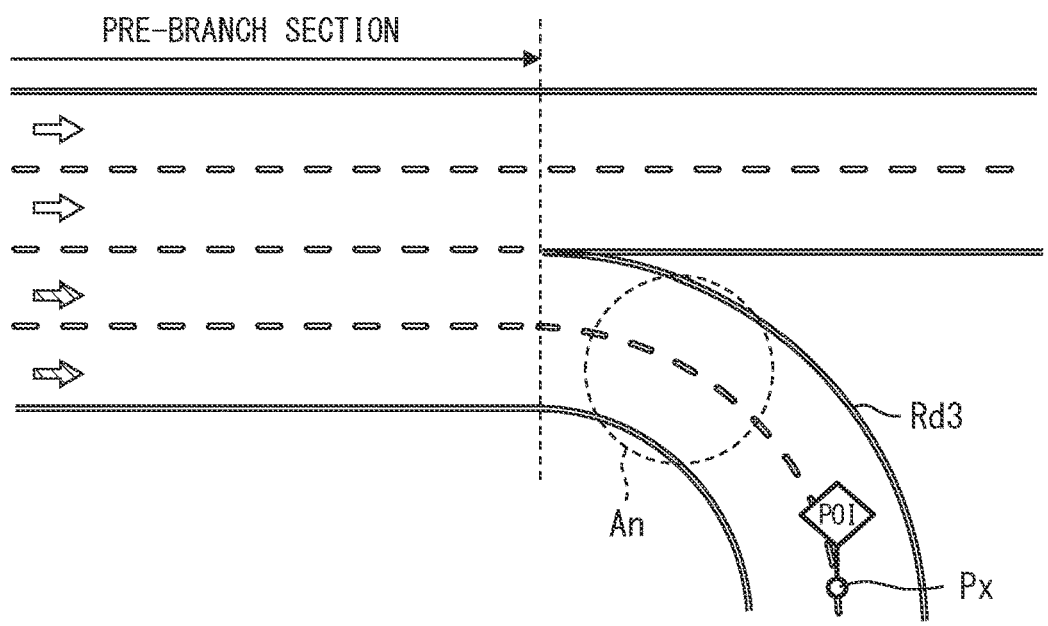
FIG. 17 is a diagram showing a suitable installation position of a notice area in a case where a POI exists near a branch point.

On the basis of a similar technical idea, the notice area setting unit G2 may be configured not to arrange the notice area An in a pre-branch section which is a section located backward of a branch point when the POI exists frontward of the branch point in the traveling direction. For example, as shown in FIG. 17, in a case where the POI exists frontward of the branch point in the traveling direction, the notice area setting unit G2 arranges the notice area frontward of the branch point in the traveling direction.

In a case where a distance between the branch point and the POI is less than a predetermined value such as less than 200 m, a notice area dedicated to user notification may be disposed in the pre-branch section instead of arranging a notice area for automatically executing the travel control. Such a configuration allows the user to at least perceive the POI existing ahead of the branch point and prepare for the POI. This configuration is equivalent to a configuration in which a notice area for executing the travel control such as lane change or deceleration is not disposed in a section in which the target vehicle cannot be limited by the traveling direction, that is, in a section in which an erroneous reaction of the vehicle can occur. In addition, the above configuration is equivalent to a configuration in which, in a section in which the target vehicle cannot be limited by the traveling direction, a notice area for user notification is disposed instead of arranging a notice area for automatically executing predetermined travel control.

There is a case where the target vehicle can be limited by the number of the traveling lane even when the target vehicle cannot be limited by the traveling direction. In a case where the target vehicle can be limited by the number of the traveling lane, the notice area may be disposed in the pre-branch section even when the POI exists frontward of the branch point in the traveling direction as shown in FIG. 17. In that case, it is assumed that a lane ID for the branching lane is set as the validity condition.

The more the number of items of the validity condition set by the map server 1 is, the stricter and the less likely to be satisfied the validity condition is. That is, the more the number of items of the validity condition, the less possibility that the vehicle erroneously responds to an irrelevant POI. From the above viewpoint, the validity condition setting unit G3 preferably sets the validity condition for two or more items.

In addition, the driving assistance ECU 30 may relax or tighten the validity condition distributed from the map server 1 on the basis of an evaluation value of the actual position estimation accuracy of the vehicle.

For example, in a configuration in which the map server 1 arranges a plurality of notice areas for one POI, the POI recognizer F7 may change the valid number in accordance with localization accuracy. Specifically, in a case where the localization accuracy is a predetermined level or more, the passed-through number for responding to the POI may be made smaller than the value set as the validity condition. For example, when the passed-through number set as the validity condition is three and the localization accuracy is a predetermined level or more, the passed-through number for responding to the POI may be reduced to one or two. In a case where the host vehicle position can be estimated with high accuracy, it is expected that the passing through other notice areas can also be detected, and thus, the load of the processing unit 31 can be reduced by omitting unnecessary processing.

On the other hand, in a case where the localization accuracy is less than a predetermined level, the passed-through number for responding to the POI may be made greater than the value set as the validity condition. For example, when the passed-through number set as the validity condition is three and the localization accuracy is less than a predetermined level, the passed-through number for responding to the POI may be increased to four or five. In a case where the estimation accuracy of the host vehicle position is deteriorated, it is possible to reduce an inappropriate action of the system by increasing the passed-through number.

Note that the evaluation value of the actual position estimation accuracy of the vehicle is, for example, the vehicle position error calculated by the position error acquirer F6. The smaller the vehicle position error, the higher the localization accuracy. The vehicle position error being less than a predetermined error threshold value is equivalent to a high level of localization accuracy. The vehicle position error being equal to or greater than a predetermined error threshold value is equivalent to a low level of localization accuracy. The error threshold value can be, for example, 1.0 m, 0.5 m, or 1.5 m. Note that the threshold value for determining that the localization accuracy is at a high level may be different from the threshold value for determining that the localization accuracy is at a low level. In other words, the localization accuracy may be evaluated in three or more stages such as a low level, a medium level, and a high level by using a plurality of thresholds values having different magnitudes. Note that the position estimation accuracy may be determined on the basis of the positioning accuracy of the GNSS. The position estimation accuracy may be determined on the basis of both the localization accuracy of the host vehicle and the GNSS. The localization accuracy and the positioning accuracy are equivalent to the position estimation accuracy. For example, the vehicle position error is equivalent to accuracy information.

Furthermore, the driving assistance ECU 30 may adjust the size of the notice area distributed from the map server 1 in accordance with the actual position estimation accuracy.

For example, when the localization accuracy is a predetermined level or more, the area radius Rn notified from the map server 1 may be reduced by a predetermined amount. Specifically, in a case where a set value of the area radius Rn notified from the map server 1 is 20 m and the localization accuracy is the predetermined level or more, the area radius Rn may be reduced to 10 m or the like, and then the area passed-through determination may be performed. The above configuration can reduce the possibility of an inappropriate action against a POI unrelated to the host vehicle. On the other hand, when the localization accuracy is less than a predetermined level, the area radius Rn notified from the map server 1 may be increased by a predetermined amount. Specifically, in a case where a set value of the area radius Rn notified from the map server 1 is 15 m and the localization accuracy is less than the predetermined level, the area radius Rn may be increased to 25 m or the like, and then the area passed-through determination may be performed. This configuration can reduce a possibility of overlooking a POI to be originally responded due to a position estimation error.

A minimum value for reducing the area radius Rn may be determined in accordance with the type of the POI. For example, the minimum value of the area radius Rn of the local POI can be set to a standard lane width. The minimum value of the area radius Rn of the entire POI can be set to a value obtained by adding a predetermined tolerance to a road width. The standard lane width may be set to a value according to the laws and regulations of the region where the host vehicle is used. For example, the standard lane width can be set to 2.5 m or 3.0 m. A setting value of the standard lane width may be changed in accordance with the category of the road on which the host vehicle is traveling. The standard lane width of a general road may be set to be smaller than the standard lane width of a highway. In such a configuration, the setting value corresponding to the road category is applied as the area radius Rn, and it becomes easier to reduce inappropriate actions of the system and to reduce the possibility of overlooking the POI.

The control planner F9 may change the content of action against the POI in accordance with the position estimation accuracy of the vehicle. For example, in a case where the localization accuracy is a predetermined level or more, a plan for automatically executing travel control such as deceleration or a lane change is created. On the other hand, in a case where the localization accuracy is less than a predetermined level, only user notification may be executed without planning automatic travel control corresponding to the POI. That is, in a case where the evaluation value of the position estimation accuracy is poor, the action against the POI may be limited to user notification. This configuration is equivalent to a configuration in which the system action against is changed in accordance with the position estimation accuracy.

In the embodiment described above, a mode has been disclosed in which the driving assistance ECU 30 responds to a certain POI in a case where all the validity conditions set for the POI are satisfied, but the present disclosure is not limited to this mode. In a case where only some of the plurality of validity condition are satisfied, information presentation to the user may be performed without performing automatic execution of control such as a lane change. The reason is that, in a case where even some of the validity conditions are satisfied, there is a possibility that the POI is a POI valid for the host vehicle. Such a configuration is equivalent to a configuration in which the action content is changed in accordance with the number of validity conditions satisfied among the plurality of validity conditions.

<Modification of System Configuration>

In the above-described embodiment, a configuration in which the driving assistance ECU 30 includes the POI recognizer F7 has been disclosed, but an arrangement mode of various functional units is not limited to this configuration. The camera ECU 212 may include the POI recognizer F7. Furthermore, as described above, the camera ECU 212 and the driving assistance ECU 30 may be integrated. In other words, the driving assistance ECU 30 may have a function as the camera ECU 212.

In addition, the detection results of various surrounding monitoring sensors such as millimeter wave radar, sonar, and LiDAR may be input to the driving assistance ECU 30. The surrounding monitoring sensor can include an in-vehicle camera (so-called surrounding monitoring camera) such as a rear camera, a right side camera, and a left side camera. The environment recognizer F8 may be configured to recognize the traveling environment by sensor fusion processing of integrating the detection results of the millimeter wave radar and the LiDAR by the front camera 21 with a predetermined weight.

<Appendix (1)>

The control unit, the processing unit, and the method thereof described in the present disclosure may be implemented by a dedicated computer configuring a processor programmed to execute one or a plurality of functions embodied by a computer program. The device and the method thereof described in the present disclosure may be implemented by using a dedicated hardware logic circuit. Furthermore, the device and the method thereof described in the present disclosure may be implemented by one or more dedicated computers configured by a combination of a processor that executes a computer program and one or more hardware logic circuits. The computer program may be stored in a computer-readable non-transitory tangible recording medium as an instruction executed by a computer. For example, means and/or functions provided by the server processor 11 or the like can be provided by software recorded in a tangible memory device and a computer that executes the software, only software, only hardware, or a combination thereof. For example, some or all of the functions of the server processor 11 may be implemented as hardware. A mode in which a certain function is implemented as hardware includes a mode in which the function is implemented by using one or more ICs or the like. The server processor 11 may be implemented by using an MPU, a GPU, or a data flow processor (DFP) instead of the CPU. The server processor 11 may be implemented by combining a plurality of kinds of arithmetic processing devices such as a CPU, an MPU, and a GPU. The server processor 11 may be implemented as a system-on-chip (SoC).

Furthermore, the various processing units may be implemented by using a field-programmable gate array (FPGA) or an application specific integrated circuit (ASIC). The same applies to the processing unit 31 of the vehicle. The various programs are only required to be stored in a non-transitory tangible storage medium. Various storage media such as a hard disk drive (HDD), a solid state drive (SSD), an erasable programmable ROM (EPROM), a flash memory, and a secure digital (SD) card can be adopted as a storage medium of the program.

<Appendix (2)>

The present disclosure also includes the configurations and methods described as the following items. Note that a vehicular device described below is equivalent to the driving assistance ECU 30 described above, and a point of interest is equivalent to the POI.

According to an aspect of the present disclosure, a vehicle control method is executed by cooperation of a map server and a vehicular device. The vehicle control method includes acquiring, by the map server, a position coordinate and a category of a real point that is an actually existing point at which a point of interest used in travel control is located. The vehicle control method includes setting, by the map server, a notice area having a predetermined size and located at a predetermined distance backward from the real point in a traveling direction along a road. The vehicle control method includes generating, by the map server, target vehicle information indicating a condition of a target vehicle to be affected by the point of interest. The vehicle control method includes distributing, by the map server, map data as a data set regarding the information of the notice area, and category information of the point of interest. The vehicle control method includes acquiring, by the vehicular device, vehicle position information indicating a current position of a host vehicle in which the vehicular device is provided. The vehicle control method includes acquiring, by the vehicular device, the map data distributed from the map server. The vehicle control method includes determining, by the vehicular device, whether the host vehicle has passed through the notice area indicated in the map data based on the vehicle position information. The vehicle control method includes determining, by the vehicular device, whether the point of interest corresponding to the notice area affects a traveling plan of the host vehicle based on the target vehicle information corresponding to the notice area and information obtained from an in-vehicle sensor when it is determined that the host vehicle has passed through the notice area. The vehicle control method includes creating, by the vehicular device, a control plan according to a category of the point of interest when it is determined that the point of interest affects the traveling plan of the host vehicle.

The target vehicle information generated by the map server may include a vehicle model of the target vehicle to be affected by the point of interest. The vehicle control method may further include determining, by the vehicular device, whether a vehicle model of the host vehicle matches the vehicle model indicated in the target vehicle information. The determining whether the point of interest affects the traveling plan of the host vehicle may include determining that the point of interest affects the traveling plan of the host vehicle when it is determined that the vehicle model of the host vehicle matches the vehicle model indicated in the target vehicle information.

According to this method, only when the vehicle model of the host vehicle is specific, such as a large vehicle or an automated-driving vehicle, the host vehicle can act against a POI indicating, for example, a climbing lane or an automated-driving lane.

The setting of the notice area by the map server may include changing the size of the notice area in accordance with an expected value of estimation accuracy of the current position of the host vehicle within an area located at a predetermined distance backward from the point of interest.

According to this method, when the host vehicle is positioned in an area where the estimation accuracy is expected to be low, the size of the notice area can be increased more than a standard size. As a result, a risk of erroneously determining that the host vehicle has passed through the notice area can be reduced.

The vehicle control method may further include acquiring, by the vehicular device, accuracy information indicating the estimation accuracy of the current position of the host vehicle. The determining by the vehicular device whether the host vehicle has passed through the notice area may include changing the size of the notice area based on the accuracy information.

According to this method, a risk of erroneously determining that the host vehicle has passed through the notice area can be reduced.

When the category of the point of interest is an obstacle, the map data distributed from the map server may include trajectory determination data for determining a traveling trajectory of the target vehicle near the point of interest.

According to this method, the vehicular device as a receiver of the map data can recognize a point at which the obstacle exists in advance. Further, the traveling trajectory for avoiding the obstacle can be calculated in advance. Therefore, a traveling trajectory plan can be calculated such that the host vehicle travels smoothly in an entire of the traveling trajectory. The traveling trajectory near the point of interest means, for example, a traveling trajectory within a range of around 20 m from the real point.

The setting of the notice area by the map server may include placing the notice area backward of a curve in the traveling direction when the point of interest is an obstacle and located within the curve or forward of the curve. When the point of interest is an obstacle and located within the curve or forward of the curve, the map data distributed by the map server may include a target speed of the target vehicle at the point of interest and trajectory determination data for determining a traveling trajectory of the target vehicle near the point of interest.

According to this method, the vehicular device as a receiver of the map data can recognize presence of the obstacle before entry into the curve even if the obstacle is at a position that is a blind spot for an autonomous sensor due to the curve. Then, the vehicle speed can be reduced sufficiently in advance, or a smooth traveling trajectory avoiding the obstacle can be calculated. Therefore, acceleration or deceleration more than a predetermined degree can be prevented. As a result, a risk of giving an occupant a feeling of discomfort caused by sudden braking or abrupt steering can be reduced.

The setting of the notice area by the map server may include placing the notice area between a branch point and the point of interest when the point of interest is located forward of the branch point in the traveling direction.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle control method configured to be executed by cooperation of a map server and a vehicular device, the vehicle control method comprising:
   causing a server processor of the map server to perform:
      acquiring a position coordinate and a category of a real point that is an actually existing point at which a point of interest used in travel control is located;
      setting notice areas each having a predetermined size and located on a road at a predetermined distance backward from the real point in a traveling direction, each of the notice areas being an area for advance notification of presence of the point of interest;
      generating target vehicle information indicating a condition of a target vehicle to be affected by the point of interest, the target vehicle information including a passed-through ratio or a passed-through number set for the notice areas arranged for the point of interest; and
      distributing map data as a data set regarding the point of interest, the map data including the target vehicle information, position information of the notice areas, and category information of the point of interest, the map data not including network data indicating a connection relationship of a road network; and
   causing a driving assistance processor of the vehicular device to perform:
      acquiring vehicle position information indicating a current position of a host vehicle in which the vehicular device is provided;
      acquiring the map data distributed from the map server;
      determining whether the host vehicle has passed through the notice areas indicated in the map data based on the vehicle position information;
      determining whether a ratio or a number of areas through which the host vehicle has passed among the notice areas is greater than or equal to the passed-through ratio or the passed-through number indicated in the target vehicle information;
      determining, using the data set regarding the point of interest that is not associated with the network data, that the point of interest corresponding to the notice areas affects a traveling plan of the host vehicle when it is determined that the ratio or the number of the areas through which the host vehicle has passed is greater than or equal to the passed-through ratio or the passed-through number indicated in the target vehicle information;
      creating a control plan according to a category of the point of interest when it is determined that the point of interest affects the traveling plan of the host vehicle; and
      outputting a control signal to an in-vehicle actuator or an in-vehicle control unit, the control signal corresponding to the control plan, wherein the vehicle is controlled according to the control plan to take an action according to the category of the point of interest.

2. The vehicle control method according to claim 1, wherein
   the setting of the notice areas by the map server includes arranging the notice areas in a non-parallel section where an angle between a first road and a second road is larger than or equal to a predetermined angle threshold without arranging the notice areas in a parallel section where the first road and the second road are parallel in extending direction when the point of interest exists on the first road, the second road extends along the first road, and the second road is separated from the first road by a predetermined distance or less.

3. The vehicle control method according to claim 1, further comprising:
   causing the driving assistance processor to perform:
      acquiring accuracy information indicating estimation accuracy of the current position of the host vehicle; and
      changing a content of action against the point of interest in the control plan depending on the accuracy information.

4. The vehicle control method according to claim 1, wherein
   the target vehicle information generated by the map server includes a traveling direction of the target vehicle to be affected by the point of interest,
   the vehicle control method further comprises causing the driving assistance processor to perform determining whether a moving direction of the host vehicle matches the traveling direction indicated in the target vehicle information, and
   the determining whether the point of interest affects the traveling plan of the host vehicle includes determining that the point of interest affects the traveling plan of the host vehicle when it is determined that the moving direction of the host vehicle matches the traveling direction indicated in the target vehicle information.

5. The vehicle control method according to claim 1, wherein
   the target vehicle information generated by the map server includes a traveling lane of the target vehicle to be affected by the point of interest,
   the vehicle control method further comprises causing the driving assistance processor to perform determining whether a traveling lane of the host vehicle matches the traveling lane indicated in the target vehicle information, and
   the determining whether the point of interest affects the traveling plan of the host vehicle includes determining that the point of interest affects the traveling plan of the host vehicle when it is determined that the traveling lane of the host vehicle matches the traveling lane indicated in the target vehicle information.

6. The vehicle control method according to claim 1, wherein
the target vehicle information generated by the map server includes a range of a traveling speed of the target vehicle to be affected by the point of interest,
the vehicle control method further comprises causing the driving assistance processor to perform determining whether a traveling speed of the host vehicle falls within the range of the traveling speed indicated in the target vehicle information, and
the determining whether the point of interest affects the traveling plan of the host vehicle includes determining that the point of interest affects the traveling plan of the host vehicle when it is determined that the traveling speed of the host vehicle falls within the range of the traveling speed indicated in the target vehicle information.

7. The vehicle control method according to claim 1, wherein
the map data distributed by the map server does not include network data indicating a connection relationship of roads.

8. The vehicle control method according to claim 1, wherein
the map data distributed by the map server includes information regarding a landmark existing within a predetermined distance from the notice area, in addition to the target vehicle information, the position information, and the category information.

9. The vehicle control method according to claim 1, wherein
the map data distributed by the map server includes reference information for executing control of the target vehicle according to the category of the point of interest, and
the reference information includes at least one of a target speed of the target vehicle at the point of interest, a position of the target vehicle at which arithmetic processing is started for determining a position of the target vehicle at which adjustment of a traveling speed of the target vehicle toward the target speed is started, trajectory determination data for determining a traveling trajectory of the target vehicle near the point of interest, or information of a recommended lane for the target vehicle.

10. The vehicle control method according to claim 1, wherein
when the category of the point of interest is a start point of a curve, the map data distributed by the map server includes a target speed of the target vehicle at the point of interest and information of a position of the target vehicle at which arithmetic processing is started for determining a position of the target vehicle at which adjustment of a traveling speed of the target vehicle toward the target speed is started.

11. The vehicle control method according to claim 1, wherein
the network data comprises road node data and position coordinates of the road node data.

12. A vehicle control method configured to be executed by cooperation of a map server and a vehicular device, the vehicle control method comprising:
causing a server processor of the map server to perform:
acquiring a position coordinate and a category of a real point that is an actually existing point at which a point of interest used in travel control is located;
setting a notice area having a predetermined size and located at a predetermined distance backward from the real point in a traveling direction along a road;
generating target vehicle information indicating a condition of a target vehicle to be affected by the point of interest; and
distributing map data as a data set regarding the point of interest, the map data including the target vehicle information, position information of the notice area, and category information of the point of interest, the map data not including network data indicating a connection relationship of a road network; and
causing a driving assistance processor of the vehicular device to perform:
acquiring vehicle position information indicating a current position of a host vehicle in which the vehicular device is provided;
acquiring the map data distributed from the map server;
determining whether the host vehicle has passed through the notice area indicated in the map data based on the vehicle position information;
determining, using the data set regarding the point of interest that is not associated with the network data, whether the point of interest corresponding to the notice area affects a traveling plan of the host vehicle based on the target vehicle information corresponding to the notice area and information obtained from an in-vehicle sensor when it is determined that the host vehicle has passed through the notice area; and
creating a control plan according to a category of the point of interest when it is determined that the point of interest affects the traveling plan of the host vehicle; and
outputting a control signal to an in-vehicle actuator or an in-vehicle control unit, the control signal corresponding to the control plan, wherein the vehicle is controlled according to the control plan to take an action according to the category of the point of interest, wherein
the setting of the notice area by the map server includes arranging the notice area in a non-parallel section where an angle between a first road and a second road is larger than or equal to a predetermined angle threshold without arranging the notice area in a parallel section where the first road and the second road are parallel in extending direction when the point of interest exists on the first road, the second road extends along the first road, and the second road is separated from the first road by a predetermined distance or less.

13. A vehicle control method configured to be executed by cooperation of a map server and a vehicular device, the vehicle control method comprising:
causing a server processor of the map server to perform:
acquiring a position coordinate and a category of a real point that is an actually existing point at which a point of interest used in travel control is located;
setting a notice area having a predetermined size and located at a predetermined distance backward from the real point in a traveling direction along a road;
generating target vehicle information indicating a condition of a target vehicle to be affected by the point of interest; and
distributing map data as a data set regarding the point of interest, the map data including the target vehicle information, position information of the notice area, and category information of the point of interest, the map data not including network data indicating a connection relationship of a road network; and causing a driving assistance processor of the vehicular device to perform:

acquiring vehicle position information indicating a current position of a host vehicle in which the vehicular device is provided;

acquiring the map data distributed from the map server;

determining whether the host vehicle has passed through the notice area indicated in the map data based on the vehicle position information;

determining, using the data set regarding the point of interest that is not associated with the network data, whether the point of interest corresponding to the notice area affects a traveling plan of the host vehicle based on the target vehicle information corresponding to the notice area and information obtained from an in-vehicle sensor when it is determined that the host vehicle has passed through the notice area;

creating a control plan according to a category of the point of interest when it is determined that the point of interest affects the traveling plan of the host vehicle;

outputting a control signal to an in-vehicle actuator or an in-vehicle control unit, the control signal corresponding to the control plan, wherein the vehicle is controlled according to the control plan to take an action according to the category of the point of interest;

acquiring accuracy information indicating estimation accuracy of the current position of the host vehicle; and changing a content of the action against the point of interest in the control plan depending on the accuracy information.

14. The vehicle control method according to claim 13, further comprising the acquiring of the accuracy information includes calculating an error of the current position of the host vehicle, wherein the changing of the content of the action includes automatically executing at least one of change in traveling position or adjustment in traveling speed when the error of the current position is less than a predetermined error threshold, and executing processing of notifying an occupant of information corresponding to the category of the point of interest when the error of the current position is greater than or equal to the predetermined error threshold.

15. A vehicular device for vehicle control using map data including information regarding a point of interest used in travel control, the vehicular device comprising:

a map acquirer configured to acquire a map data distributed from a map server, the map data being a data set including target vehicle information indicating a condition of a target vehicle to be affected by the point of interest, position information of notice areas corresponding to the point of interest, and category information of the point of interest, the map data not including network data indicating a connection relationship of a road network;

a vehicle position acquirer configured to acquire vehicle position information indicating a current position of a host vehicle;

a passed-through determiner configured to determine whether the host vehicle has passed through the notice areas indicated in the map data based on the vehicle position information acquired by the vehicle position acquirer;

a validity determiner configured to determine, using the data set regarding the point of interest that is not associated with the network data, whether the point of interest corresponding to the notice areas affects a traveling plan of the host vehicle based on the target vehicle information corresponding to the notice areas and information obtained from an in-vehicle sensor when the passed-through determiner determines that the host vehicle has passed through the notice areas;

a control planner configured to create a control plan according to a category of the point of interest when the validity determiner determines that the point of interest affects the traveling plan of the host vehicle; and a control signal to an in-vehicle actuator or an in-vehicle control unit, the control signal corresponding to the control plan, wherein the vehicle is controlled according to the control plan to take an action according to the category of the point of interest, wherein the target vehicle information includes a passed-through ratio or a passed-through number for the notice areas arranged for the point of interest, the validity determiner is configured to determine whether a ratio or a number of areas through which the host vehicle has passed among the notice areas arranged for the point of interest is greater than or equal to the passed-through ratio or the passed-through number indicated in the target vehicle information, and the validity determiner determines that the point of interest affects the traveling plan of the host vehicle when the validity determiner determines that the ratio or the number of the areas through which the host vehicle has passed is greater than or equal to the passed-through ratio or the passed-through number indicated in the target vehicle information.

16. A vehicular device for vehicle control using map data including information regarding a point of interest used in travel control, the vehicular device comprising:

a map acquirer configured to acquire a map data distributed from a map server, the map data being a data set including target vehicle information indicating a condition of a target vehicle to be affected by the point of interest, position information of notice area corresponding to the point of interest, and category information of the point of interest, the map data not including network data indicating a connection relationship of a road network;

a vehicle position acquirer configured to acquire vehicle position information indicating a current position of a host vehicle;

an error acquirer configured to acquire accuracy information indicating estimation accuracy of the current position of the host vehicle acquired by the vehicle position acquirer;

a passed-through determiner configured to determine whether the host vehicle has passed through the notice area indicated in the map data based on the vehicle position information acquired by the vehicle position acquirer;

a validity determiner configured to determine, using the data set regarding the point of interest that is not associated with the network data, whether the point of interest corresponding to the notice area affects a traveling plan of the host vehicle based on the target vehicle information corresponding to the notice area and information obtained from an in-vehicle sensor when the passed-through determiner determines that the host vehicle has passed through the notice area;

a control planner configured to create a control plan according to a category of the point of interest when the validity determiner determines that the point of interest affects the traveling plan of the host vehicle; and a control executor configured to output a control signal to an in-vehicle actuator or an in-vehicle control unit, the control signal corresponding to the control plan, wherein the vehicle is controlled according to the control plan to take an action according to the category of the point of interest, wherein the control planner changes a content of the action against the point of interest in the control plan depending on the accuracy information.

* * * * *